United States Patent
Toyoda et al.

(10) Patent No.: US 12,195,817 B2
(45) Date of Patent: Jan. 14, 2025

(54) HOT-ROLLED STEEL SHEET AND WELD JOINT, AND METHODS FOR PRODUCING SAME

(71) Applicant: NIPPON STEEL CORPORATION, Tokyo (JP)

(72) Inventors: Takeshi Toyoda, Tokyo (JP); Hitoshi Nikaido, Tokyo (JP); Kohei Nakada, Tokyo (JP); Yui Yamashita, Tokyo (JP); Kazuki Matsuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 761 days.

(21) Appl. No.: 17/420,024

(22) PCT Filed: Dec. 24, 2019

(86) PCT No.: PCT/JP2019/050695
§ 371 (c)(1),
(2) Date: Jun. 30, 2021

(87) PCT Pub. No.: WO2020/145136
PCT Pub. Date: Jul. 16, 2020

(65) Prior Publication Data
US 2022/0090224 A1   Mar. 24, 2022

(30) Foreign Application Priority Data
Jan. 9, 2019   (JP) ................. 2019-002035

(51) Int. Cl.
| | | |
|---|---|---|
| C21D 9/46 | (2006.01) | |
| B23K 9/16 | (2006.01) | |
| C21D 8/02 | (2006.01) | |
| C21D 9/50 | (2006.01) | |
| C22C 38/00 | (2006.01) | |
| C22C 38/02 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/50 | (2006.01) | |
| C22C 38/54 | (2006.01) | |
| C22C 38/58 | (2006.01) | |

(52) U.S. Cl.
CPC .......... *C21D 9/46* (2013.01); *B23K 9/16* (2013.01); *C21D 8/0226* (2013.01); *C21D 9/505* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/50* (2013.01); *C22C 38/54* (2013.01); *C22C 38/58* (2013.01); *C21D 2211/002* (2013.01); *C21D 2211/005* (2013.01)

(58) Field of Classification Search
CPC ....................................... C21D 9/46
See application file for complete search history.

(56) References Cited

FOREIGN PATENT DOCUMENTS

| JP | 2007-138290 A | 6/2007 |
|---|---|---|
| JP | 2007-302947 A | 11/2007 |
| JP | 2010-90476 A | 4/2010 |
| JP | 2017-25397 A | 2/2017 |

*Primary Examiner* — Jophy S. Koshy
(74) *Attorney, Agent, or Firm* — Birch, Stewart, Kolasch & Birch, LLP

(57) ABSTRACT

Hot-rolled steel sheet having a chemical composition including, in mass %, C: 0.02 to 0.20%, Si: 0.01 to 1.50%, Mn: 0.10 to 3.00%, P: 0.10% or less, S: 0.010% or less, Al: 0.005 to 0.100%, Ti: 0.02 to 0.20%, N: 0.001 to 0.010%, Cu: 0 to 0.50%, Ni: 0 to 0.50%, Cr: 0 to 1.00%, Mo: 0 to 0.40%, Nb: 0 to 0.060%, V: 0 to 1.00%, B: 0 to 0.0100%, Ca: 0 to 0.0050%, O: 0.0100% or less, and the balance: Fe and impurities; in which: a steel micro-structure includes, in area %, ferrite: 60 to 80%, and a total of ferrite and bainite: 90% or more; an average of the crystal grain size of ferrite and bainite is 7.0 μm or less, a standard deviation of the crystal grain size is 2.0 μm or less; and a standard deviation of a diameter of Ti carbo-nitrides is 10 nm or less.

10 Claims, 6 Drawing Sheets

(a)

(b)

HOT-ROLLED STEEL SHEET AND WELD JOINT, AND METHODS FOR PRODUCING SAME

TECHNICAL FIELD

The present invention relates to a hot-rolled steel sheet and a weld joint, and methods for producing the hot-rolled steel sheet and the weld joint.

BACKGROUND ART

From the viewpoint of improving safety and reducing weight, a steel sheet to be used for the body structure of an automobile is required to have enhanced strength and high press workability. In response to such requirements, a high-strength steel sheet that is excellent in hole expandability which is better than the conventional technology has been proposed.

Conventionally, as such kinds of high-strength hot-rolled steel sheet for working, hot-rolled steel sheets having a mixed structure composed of a ferritic and martensitic structure or a ferritic and bainitic structure, and hot-rolled steel sheets having a substantially single-phase structure mainly composed of bainite or ferrite are widely known.

For example, Patent Document 1 discloses a hot-rolled steel sheet that has a tensile strength of 780 MPa or more and has both high hole expandability and bake hardenability, and a method for producing the hot-rolled steel sheet.

LIST OF PRIOR ART DOCUMENTS

Patent Document

Patent Document 1: JP2017-25397A

SUMMARY OF INVENTION

Technical Problem

In this connection, due to reasons such as durability and impact properties with respect to impacts received from step heights and the like, a steel sheet to be used for a suspension system member of an automobile is required to have toughness as a member in addition to strength and workability during press forming. However, Patent Document 1 does not give sufficient consideration to toughness, and room for improvement remains.

An objective of the present invention, which has been made to solve the problem described above, is to provide a hot-rolled steel sheet having excellent toughness in addition to high strength and hole expandability, and a weld joint that includes the hot-rolled steel sheet, as well as methods for producing the hot-rolled steel sheet and the weld joint.

Solution to Problem

The present invention has been made to solve the problem described above, and the gist of the present invention is a hot-rolled steel sheet and a weld joint as well as methods for producing the hot-rolled steel sheet and the weld joint which are described hereunder.

(1) A hot-rolled steel sheet having a chemical composition including, in mass %:
C: 0.02 to 0.20%,
Si: 0.01 to 1.50%,
Mn: 0.10 to 3.00%,
P: 0.10% or less,
S: 0.010% or less,
Al: 0.005 to 0.100%,
Ti: 0.02 to 0.20%,
N: 0.001 to 0.010%,
Cu: 0 to 0.50%,
Ni: 0 to 0.50%,
Cr: 0 to 1.00%,
Mo: 0 to 0.40%,
Nb: 0 to 0.060%,
V: 0 to 1.00%,
B: 0 to 0.0100%,
Ca: 0 to 0.0050%,
O: 0.0100% or less, and
the balance: Fe and impurities,
wherein:
a steel micro-structure includes, in area %:
ferrite: 60 to 80%, and
a total of ferrite and bainite: 90% or more;
an average of a crystal grain size of ferrite and bainite is 7.0 µm or less, and a standard deviation of the crystal grain size is 2.0 µm or less; and
a standard deviation of a diameter of Ti carbo-nitrides is 10 nm or less.

(2) The hot-rolled steel sheet according to (1) above, wherein:
the chemical composition contains at least one of, in mass %:
Cu: 0.01 to 0.50%,
Ni: 0.01 to 0.50%,
Cr: 0.01 to 1.00%,
Mo: 0.005 to 0.40%,
Nb: 0.001 to 0.060%,
V: 0.01 to 1.00%,
B: 0.0005 to 0.0100%, and
Ca: 0.0005 to 0.0050%.

(3) A method for producing a hot-rolled steel sheet, that includes performing, in order:
(a) a process of casting a slab having a chemical composition according to (1) or (2) above;
(b) a slabbing process of, after casting, without a temperature of the slab decreasing to less than 800° C., performing a rough rolling process described hereunder, or inserting the slab into a slab heating furnace and heating the slab to within a range of 1100 to 1250° C.;
(c) a rough rolling process of performing hot rolling of the slab in which a start temperature is within a range of 950 to 1200° C., an end temperature is within a range of 800 to 1050° C., and a total rolling reduction is 20% or more, to form a sheet bar;
(d) a sheet bar heating process of heating the sheet bar for 60 seconds or more to a temperature range of 1100 to 1250° C. at an average heating rate of 100° C./min or more;
(e) a finish rolling process of, within 20 seconds after the sheet bar heating process ends, subjecting the sheet bar to hot rolling with a start temperature within a range of 900 to 1250° C. and an end temperature within a range of an $Ar_3$ point or more to less than 950° C., and with a total rolling reduction of 50% or more, to form a steel sheet;
(f) a cooling process of subjecting the steel sheet to primary cooling to a temperature range of 600 to 750° C. at an average cooling rate of 60° C./s or more, and thereafter conducting slow cooling at an average cooling rate of 0 to 10° C./s for a period of 0 to 10 seconds, and additionally thereafter conducting secondary cooling at an average cooling rate of 60° C./s or more to a temperature which is equal to or less than a temperature 15° C. or more lower than an end temperature of the slow cooling and which is within a temperature range of 350 to 700° C.; and (g) a coiling process of coiling the steel sheet.

(4) A weld joint, including a first base metal portion, a second base metal portion and a weld metal portion, wherein:

the weld metal portion is formed so as to extend at least in a first direction along an end portion of the first base metal portion;

the first base metal portion is a hot-rolled steel sheet according to (1) or (2) above;

a chemical composition of the weld metal portion includes, in mass %:

C: 0.02 to 0.15%,
Si: 0.01 to 1.50%,
Mn: 0.10 to 1.50%,
P: 0.10% or less,
S: 0.010% or less,
Al: 0.005 to 0.300%,
Ti: 0.02 to 0.20%,
N: 0.010% or less,
Cu: 0 to 0.50%,
Ni: 0 to 0.50%,
Cr: 0 to 1.00%,
Mo: 0 to 0.60%,
Nb: 0 to 0.060%,
V: 0 to 1.00%,
B: 0 to 0.0100%,
Ca: 0 to 0.0050%,
O: 0.0010 to 0.0500%, and
the balance: Fe and impurities;

and when a direction perpendicular to the first direction as viewed from a thickness direction of the first base metal portion is taken as a second direction, and a thickness of the first base metal portion is represented by "t", at a cross-section which is parallel to a surface on one side in the thickness direction of the first base metal portion and which is at a position at a distance equivalent to ⅛ t in the thickness direction from the surface, $m_0$, $m_1$, $m_2$, $m_3$, $m_4$, and $m_5$ that are area fractions (%) of bainite measured in order at a pitch of 50 μm from a boundary between the first base metal portion and the weld metal portion toward the first base metal portion side in the second direction satisfy formula (i) below:

$$0 < m_{n-1} - m_n \leq 20 \qquad (i)$$

where, n in the formula is a natural number from 1 to 5.

(5) The weld joint according to (4) above, wherein: the thickness of the first base metal portion is within a range of 0.8 to 6.0 mm.

(6) The weld joint according to (4) or (5) above, wherein: the second base metal portion is a hot-rolled steel sheet according to claim 1 or claim 2.

(7) The weld joint according to any one of (4) to (6) above, wherein:

a thickness of the second base metal portion is within a range of 0.8 to 6.0 mm.

(8) The weld joint according to any one of (4) to (7) above, wherein:

the weld joint is a buttjoint groove-welded in a state in which the first base metal portion and the second base metal portion are butted together.

(9) The weld joint according to any one of (4) to (7) above, wherein:

the weld joint is a lap joint that is fillet-welded in a state in which the first base metal portion is superimposed on the one side in a thickness direction of the second base metal portion.

(10) A method for producing a weld joint, that is a method for producing a weld joint according to any one of (4) to (9) above, including:

performing gas-shielded arc welding using a solid wire or a flux cored wire with respect to the first base metal portion or the second base metal portion.

Advantageous Effects of Invention

According to the present invention, it is possible to obtain a hot-rolled steel sheet having excellent toughness in addition to high strength and hole expandability, and a weld joint that includes the hot-rolled steel sheet.

DESCRIPTION OF EMBODIMENTS

Figure 1:
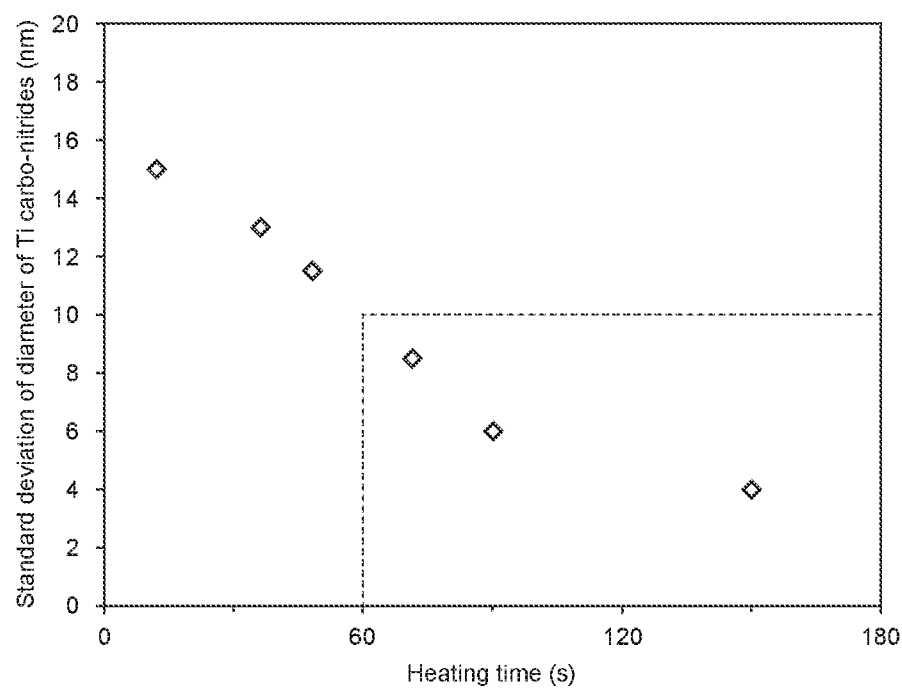
FIG. 1 is a graph illustrating a relation between a heating time period and the standard deviation of the diameter of Ti carbo-nitrides in a sheet bar heating process.

The present inventors conducted extensive studies to solve the above problem, and obtained the following findings.

(a) It is possible to improve strength and hole expandability by making the steel micro-structure of a steel sheet a micro-structure that is mainly composed of fine-grained ferrite and bainite.

(b) By additionally reducing variations in the grain size of ferrite and bainite, the toughness can be improved in addition to further improving hole expandability.

(c) However, if coarse precipitates are formed in the micro-structure, the precipitates act as starting points of cracks during local deformation, and the toughness decreases.

(d) Therefore, the present inventors performed experiments in which the average grain size of precipitates was reduced, and found that in some cases the toughness could not necessarily be decreased.

(e) The present inventors conducted further studies, and as a result found that the larger the variations in the grain size of precipitates are, the easier it is for localized cracks to occur, and the larger the variations in the grain size of ferrite and bainite become. That is, the present inventors discovered that in order to improve toughness, it is effective to not only make the average grain size of precipitates small, but moreover to make variations in the grain size small.

(f) A hot rolling process is constituted by rough rolling and finish rolling. In a common process, the temperature only simply decreases from rough rolling to finish rolling. Consequently, precipitation starts at various timings, such as during segregation or when precipitating in austenite during a plurality of rough rolling processes, which causes variations to arise in the grain size of the precipitates.

(g) In this regard, by introducing strain into precipitates that precipitate when the end temperature of rough rolling is made equal to or less than a predetermined temperature and also performing reheating after rough rolling ends, precipitates can be efficiently redissolved.

(h) By imparting strain, because the rate of dissolution of precipitates is accelerated and the diffusion velocity increases, precipitates can dissolve uniformly. In addition, by causing precipitates to redissolve after the precipitates have precipitated once, the elements constituting the precipitates will be uniformly dispersed.

(i) As a result, the precipitation timings and nucleation sites of precipitates that precipitate during ferrite transformation are uniformly dispersed, and the standard deviation of the grain size of ferrite and bainite, and not just the grain size of the precipitates can be made small.

The present invention has been made based on the above findings. The respective requirements of the present invention are described in detail hereunder.

1. Chemical Composition

The reasons for limiting each element are as follows. Note that, the symbol "%" with respect to content in the following description means "mass %".

C: 0.02 to 0.20%

C is an effective element for precipitating carbides and securing the strength of the steel sheet. If the content of C is less than 0.02%, it is difficult to secure the desired strength. On the other hand, if the content of C is more than 0.20%, the hole expandability decreases. Therefore, the content of C is set within the range of 0.02 to 0.20%. The content of C is preferably 0.03% or more, 0.04% or more, 0.05% or more, or 0.06% or more, and is preferably 0.18% or less, 0.16% or less, 0.14% or less, 0.12% or less, or 0.10% or less.

Si: 0.01 to 1.50%

Si is an element used for deoxidizing the steel. However, if the content of Si is excessive, the chemical treatment properties will decrease, and the spot weldability will also deteriorate. Therefore, the content of Si is set within the range of 0.01 to 1.50%. The content of Si is preferably 0.05% or more, 0.10% or more, 0.20% or more, or 0.30% or more, and is preferably 1.40% or less, 1.20% or less, 1.00% or less, or 0.80% or less.

Mn: 0.10 to 3.00%

Mn is an effective element for securing the strength of the steel sheet. However, if the content of Mn is excessive, microsegregation or macrosegregation is liable to occur, which will cause the hole expandability to deteriorate. Therefore, the content of Mn is set within the range of 0.10 to 3.00%. The content of Mn is preferably 0.20% or more, 0.40% or more, 0.60% or more, 0.80% or more, or 1.00% or more, and is preferably 2.60% or less, 2.20% or less, 2.00% or less, or 1.80% or less.

P: 0.10% or less

P is an impurity, and if contained in a large amount it will cause the hole expandability and toughness of the steel sheet to deteriorate. Therefore, the content of P is set to 0.10% or less. The content of P is preferably 0.050% or less, or 0.020% or less. While it is not particularly necessary to define a lower limit for the content of P that is an impurity, the lower limit thereof is 0%. If necessary, the lower limit for the content of P may be set to 0.0005% or 0.001%.

S: 0.010% or less

S forms MnS and acts as a starting point of fractures, and noticeably reduces the hole expandability of the steel sheet. Therefore, the content of S is set to 0.010% or less. The content of S is preferably 0.0080% or less, or 0.0060% or less. S is an impurity, and while it is not particularly necessary to define a lower limit for the content of S, the lower limit is 0%. If necessary, the lower limit for the content of S may be set to 0.0005% or 0.001%.

Al: 0.005 to 0.100%

Al is an element used for deoxidizing the steel. However, if the content of Al is excessive, inclusions will increase, which will cause the workability of the steel sheet to deteriorate. Therefore, the content of Al is set within the range of 0.005 to 0.100%. The content of Al is preferably 0.010% or more, 0.015% or more, or 0.020% or more, and is preferably 0.080% or less, 0.060% or less, or 0.050% or less. For the purpose of deoxidation, the content of Al may be set to 0.008% or more or 0.010% or more.

Ti: 0.02 to 0.20%

Ti causes TiC that are fine carbides to precipitate, and is an effective element for securing the strength of the steel sheet. If the content of Ti is less than 0.02%, it will be difficult to secure the desired strength. On the other hand, if the content of Ti is more than 0.20%, the effect thereof will be saturated, and the cost of the steel sheet will increase. Therefore, the content of Ti is set within the range of 0.02 to 0.20%. The content of Ti is preferably 0.04% or more, 0.06% or more, or 0.08% or more, and is preferably 0.17% or less, 0.15% or less, or 0.13% or less.

N: 0.001 to 0.010%

Although N is included as an impurity, excessive reduction of N will lead to an increase in the steel-making cost. On the other hand, N forms precipitates with Ti at a higher temperature than C, which decreases the hole expandability of the steel sheet. Therefore, the content of N is set within a range of 0.001 to 0.010%. The content of N is preferably 0.002% or more, or 0.003% or more, and is preferably 0.008% or less, 0.006% or less, or 0.005% or less.

Cu: 0 to 0.50%

Cu has an effect that increases strength, and hence may be contained as necessary. However, if the content of Cu is excessive, not only will it lead to a decrease in toughness, but there is also a risk that surface defects or the like will arise in the steel sheet. Therefore, the content of Cu is set to 0.50% or less. The content of Cu is preferably 0.40% or less, 0.30% or less, or 0.20% or less. To adequately obtain the aforementioned effect, the content of Cu is preferably 0.01% or more, 0.05% or more, or 0.10% or more. It is not essential to contain Cu, and the lower limit of the content of Cu is 0%.

Ni: 0 to 0.50%

Ni has an effect that increases toughness as well as increasing strength, and hence may be contained as necessary. However, if the content of Ni is excessive, there is a risk that surface defects or the like may occur on the steel sheet. Therefore, the content of Ni is set to 0.50% or less. The content of Ni is preferably 0.40% or less, 0.30% or less, or 0.20% or less. To adequately obtain the aforementioned effects, the content of Ni is preferably 0.01% or more, 0.05% or more, or 0.10% or more. It is not essential to contain Ni, and the lower limit of the content of Ni is 0%.

Cr: 0 to 1.00%
Mo: 0 to 0.40%
Nb: 0 to 0.060%
V: 0 to 1.00%

Cr, Mo, Nb and V contribute to improving the strength of the hot-rolled steel sheet, and therefore, as necessary, one kind selected from these elements may be contained alone, or two or more kinds may be contained in combination. However, if any of these elements is excessively contained, a large amount of carbides will be formed, which will reduce the hole expandability of the steel sheet. Therefore, the content of Cr is set to 1.00% or less, the content of Mo is set to 0.40% or less, the content of Nb is set to 0.060% or less, and the content of V is set to 1.00% or less. It is not essential to contain Ni, Cr, Mo, Nb or V, and the lower limit of the content of each of these elements is 0%.

The content of Cr is preferably 0.70% or less, the content of Mo is preferably 0.30% or less, the content of Nb is preferably 0.040% or less, and the content of V is preferably 0.60% or less. To adequately obtain the aforementioned effect, it is preferable to contain one or more kinds of element selected from Cr: 0.01% or more, Mo: 0.005% or more, Nb: 0.001% or more and V: 0.01% or more. Further, the content of Cr is preferably 0.10% or more, the content of Mo is preferably 0.050% or more, the content of Nb is preferably 0.005% or more, and the content of V is preferably 0.10% or more.

B: 0 to 0.0100%

B segregates at grain boundaries and has the effect of improving grain boundary strength, and hence may be contained as necessary. However, if the content of B is excessive, the effect will be saturated and economic efficiency will decrease. Therefore, the content of B is set to 0.0100% or less. The content of B is preferably 0.0020% or less. To adequately obtain the aforementioned effect, the content of B is preferably 0.0005% or more. It is not essential to contain B, and the lower limit of the content of B is 0%.

Ca: 0 to 0.0050%

Ca is an element that improves workability by controlling the morphology of non-metal inclusions that act as starting points of fractures and cause the workability to deteriorate, and hence may be contained as necessary. However, if the content of Ca is excessive, the aforementioned effect will be saturated and economic efficiency will decrease. Therefore, the content of Ca is set to 0.0050% or less. The content of Ca is preferably 0.0030% or less. To adequately obtain the aforementioned effect, the content of Ca is preferably 0.0005% or more. It is not essential to contain Ca, and the lower limit of the content of Ca is 0%.

O: 0.0100% or less

O is an impurity, and when contained in a large amount, there is a concern that O will form oxides with Al or Si, and the workability and toughness will decrease. Therefore, the content of O is set to 0.0100% or less. The content of O is preferably 0.0090% or less, or 0.0070% or less. It is not particularly necessary to define a lower limit for the content of O that is an impurity, and the lower limit thereof is 0%. If necessary, the lower limit for the content of O may be set to 0.0005%, 0.0010% or 0.0015%.

The balance in the chemical composition of the steel sheet of the present invention is Fe and impurities. Here, the term "impurities" refers to components which, during industrial production of the steel sheet, are mixed in from a raw material such as ore or scrap or due to various causes during the production processes, and which are allowed within a range that does not adversely affect the present invention.

2. Steel Micro-Structure

The steel micro-structure of the steel sheet of the present invention will now be described. In the following description, the symbol "%" means "area %".

By making the steel micro-structure of a steel sheet a micro-structure that is mainly composed of soft ferrite and comparatively hard bainite, it is possible to secure strength, hole expandability and toughness. Therefore, the steel micro-structure of the steel sheet according to the present invention includes, in area %, 60 to 80% of ferrite, and 90% or more in total of ferrite and bainite.

If the area fraction of ferrite is less than 60%, the desired hole expandability cannot be secured. On the other hand, if the area fraction of ferrite is more than 80%, the internal micro-structure will be fine and the area fraction of bainite that is excellent in toughness will be relatively low, and it will not be possible to secure the toughness. When importance is to be placed on hole expandability, the area fraction of ferrite is preferably 65% or more, and more preferably is 70% or more. On the other hand, when importance is to be placed on toughness, the area fraction of ferrite is preferably 75% or less, and more preferably is 70% or less.

Further, the total area fraction of ferrite and bainite is preferably 95% or more, and preferably is substantially 100%. Micro-structures such as pearlite, cementite and martensite may be intermixed in the steel micro-structure, and the total volume ratio of these micro-structures is preferably 10% or less, more preferably is 5% or less, and further preferably is 0%. Note that, among the aforementioned balance micro-structure, cementite may be included in an amount of 1% or less. On the other hand, the possibility that martensite will be included is low, and the amount of martensite may be regarded as 0%. Further, although 1% or less of retained austenite may be included in the bainite, the possibility of these micro-structures being included is low, and these micro-structures may be regarded as 0%.

Further, in the steel micro-structure of the steel sheet, the average of the crystal grain size of ferrite and bainite is 7.0 μm or less, and the standard deviation of the crystal grain size of ferrite and bainite is 2.0 μm or less. By making the micro-structure fine-grained and homogeneous, it is possible to secure strength, hole expandability and toughness. The average crystal grain size is preferably 6.0 μm or less, and more preferably is 5.0 μm or less. Although it is not particularly necessary to define a lower limit of the average crystal grain size, the lower limit may be set to 0.8 μm or 1.0 μm. Further, the standard deviation of the crystal grain size is preferably 1.5 μm or less or 1.2 μm or less. Although it is not particularly necessary to define a lower limit of the standard deviation of the crystal grain size, the lower limit may be set to 0.1 μm or 0.2 μm. Note that, with regard to the coefficient of variation (standard deviation of crystal grain size/average of crystal grain size), the coefficient of variation is preferably 0.35 or less or 0.30 or less. Although it is not particularly necessary to define a lower limit of the coefficient of variation, the lower limit may be set to 0.09 or 0.14.

In addition, in order to transform the crystal grain size of ferrite and bainite as described above into fine grains and homogenously to improve the toughness of the steel sheet, it is effective to reduce variations in the diameter of the precipitates. Therefore, in the present invention, the standard deviation of the diameter of Ti carbo-nitrides included in the steel micro-structure is set to 10 nm or less. The standard deviation of the diameter of the Ti carbo-nitrides is preferably small, and may be set to 8 nm or less, 7 nm or less, or 6 nm or less. It is not particularly necessary to define a lower limit thereof, and the lower limit is 0 nm, and may be set to 1 nm.

Note that, although the average of the diameter of the aforementioned Ti carbo-nitrides is not particularly limited, course carbo-nitrides serve as starting points of cracking, and therefore from the viewpoint of improving toughness it is preferable that the Ti carbo-nitrides are fine grains, and preferably the average diameter of the Ti carbo-nitrides is 50 nm or less, more preferably is 40 nm or less, and further preferably is 30 nm or less. Although it is not particularly necessary to define a lower limit thereof, the lower limit may be set to 0.5 nm or 1.0 nm. Further, with regard to the coefficient of variation (standard deviation of diameter/average of diameter), the coefficient of variation is preferably 0.35 or 0.30 or less. Although it is not particularly necessary to define a lower limit of the coefficient of variation, the lower limit thereof may be set to 0.10 or 0.15.

Note that, in the present invention, it is assumed that the term "steel micro-structure" refers to a micro-structure that, when the thickness of a steel sheet is represented by "t", is at a position which is at a distance equivalent to ¼ t or ¾ t from the surface of the relevant steel sheet at a cross-section perpendicular to the rolling direction of the steel sheet.

In the present invention, the area fraction of each phase, the average crystal grain size of ferrite and bainite, the standard deviation of the grain size, and the standard deviation of the grain size of Ti carbo-nitrides are determined as follows.

As mentioned above, first, a sample is taken from a position which is at a distance equivalent to ¼ t or ¾ t from the surface of the steel sheet in a manner so that a cross-section (a so-called "L-direction cross-section") which is parallel to the rolling direction and the thickness direction of the steel sheet becomes the observation surface. The observation surface is then mirror-polished and is etched with a nital etching reagent, and thereafter the micro-structure is observed using a scanning electron microscope (SEM). The magnification is set to about×1000, and 10 visual fields are observed with respect to a range of 300 μm×300 μm.

The image acquired by the SEM is subjected to image analysis using image analysis software "Photoshop CS5" manufactured by Adobe®, and the average and the standard deviation of the crystal grain sizes of ferrite and bainite are determined. As the image analysis method, for example, a method is adopted in which lamellar pearlite and spheroidized cementite are subjected to micro-structure observation to remove the lamellar pearlite and spheroidized cementite from the image analysis region, a maximum lightness value $L_{max}$ and a minimum lightness value $L_{min}$ of the image are then acquired from the image, and area fractions are calculated by taking a portion having picture elements with a lightness from $L_{max}$-0.5 ($L_{max}$-$L_{min}$) to $L_{max}$ as a bainite region, and taking a portion having picture elements with a lightness from $L_{min}$ to $L_{min}$+0.5 ($L_{max}$-$L_{min}$) as a ferrite region. In addition, the equivalent circular diameter of each grain is calculated for ferrite and bainite, respectively, and the average and standard deviation of the crystal grain sizes are calculated.

Further, a thin film having a thickness within a range of about 50 to 300 nm is prepared from a position which is at a distance equivalent to ¼ t or ¾ t from the surface of the steel sheet so that an L-direction cross-section becomes the observation surface, and a transmission electron microscope (TEM) is used to perform observation with respect to five visual fields of the thin film. Although it is not particularly necessary to define the magnification, the magnification may be, for example, about×20000. In the present invention, particles having a diameter falling within the range of 1 to 500 nm are determined as being Ti carbo-nitrides. For 300 or more Ti carbo-nitrides identified by TEM observation, image analysis is similarly performed using the image analysis software "Photoshop CS5" manufactured by Adobe®, the equivalent circular diameter of each grain is calculated, and the average and standard deviation of the diameter of the Ti carbo-nitrides are determined.

3. Mechanical Properties

In the present invention, although no particular limitations are set with respect to mechanical properties, the phrase "having high strength and hole expandability" means that the tensile strength is 780 MPa or more and a relation TS×$\lambda^{0.5}$ between the tensile strength TS (MPa) and the hole expansion ratio λ (%) is 6000 MPa·$\%^{0.5}$ or more. Further, the phrase "having excellent toughness" means that the Charpy impact absorbed energy at −40° C. is 150 kJ/cm² or more. While it is not necessary to define an upper limit of the Charpy impact absorbed energy at −40° C., 500 kJ/cm² or 400 kJ/cm² may be set as the upper limit. Note that, the tensile strength is more preferably 800 MPa or more or 830 MPa or more. While it is not necessary to define an upper limit of the tensile strength, 1200 MPa may be set as the upper limit.

4. Sheet Thickness

In the present invention, while there is no particular limitation with respect to the thickness of the steel sheet, in a case where the steel sheet is to be used as a suspension system member of an automobile, the thickness of the steel sheet is preferably made to fall within the range of 0.8 to 6.0 mm, and more preferably within the range of 1.0 to 4.0 mm or 1.2 to 3.6 mm.

5. Production Method

The present inventors have confirmed through research performed up to now that the hot-rolled steel sheet of the present invention can be produced by performing the production processes described hereinafter. Hereunder, each production process is described in detail.

(a) Casting Process

A slab having the chemical composition described above is cast. For example, a method such as thin slab continuous casting may be used as the casting method.

(b) Slabbing Process

After casting, a rough rolling process that is described below may be performed without the temperature of the obtained slab decreasing to less than 800° C., and if necessary, the slab may be inserted into a slab heating furnace to heat the slab to a temperature within the range of 1100 to 1250° C. At such time also, it is necessary to insert the slab into the slab heating furnace before the temperature of the slab decreases to less than 800° C. If the temperature of the slab falls to less than 800° C., Ti carbo-nitrides will completely precipitate and it will be difficult to cause the Ti carbo-nitrides to redissolve thereafter.

(c) Rough Rolling Process

The obtained slab is subjected to rough rolling. The start temperature of rough rolling is set within the temperature range of 950 to 1200° C., and the end temperature is set within the temperature range of 800 to 1050° C. Further, the total rolling reduction is set to 20% or more. If the start temperature of rough rolling is less than 950° C., there is a risk that the end temperature will be less than 800° C. On the other hand, if the start temperature of rough rolling is more than 1200° C., because the prior-austenite grain size will coarsen during rolling, it will not be possible to achieve the target crystal grain size and standard deviation. Note that, the term "rough" in "rough rolling" does not in itself have any special meaning, and it suffices to subject the slab obtained by the slabbing process to hot rolling under the aforementioned conditions with respect to the start temperature, total rolling reduction and end temperature. In the present invention the present process is referred to as a "rough rolling process" because the hot rolling is usually performed using a rolling mill called a "roughing mill". In the present invention, the starting material that is rolled in the rough rolling process (including a starting material heated in a sheet bar heating process also) is referred to as a "sheet bar".

Further, if the end temperature of rough rolling is less than 800° C., the Ti carbo-nitrides will completely precipitate and it will be difficult to cause the Ti carbo-nitrides to redissolve thereafter. On the other hand, in a case where the end temperature is more than 1050° C., coarse Ti carbo-nitrides will be formed at high temperature, and it will also not be possible to introduce sufficient strain during rough rolling, and it will be difficult to efficiently redissolve the Ti carbo-nitrides by heating thereafter. In addition, if the total rolling reduction in the rough rolling is less than 20%, the driving force required for redissolution of the Ti carbo-nitrides will not be sufficiently obtained, and consequently variations in the diameter of the precipitates will be large.

(d) Sheet Bar Heating Process

After rough rolling ends, heating of the sheet bar is performed to cause the precipitated Ti carbo-nitrides to redissolve. At such time, the sheet bar is heated for 60 seconds or more from the aforementioned end temperature to within a temperature range of 1100 to 1250° C. at an average heating rate of 100° C./min or more. That is, in the present heating process, the temperature is increased 100° C. or more.

If the average heating rate is less than 100° C./min, the heating time period will lengthen and the steel micro-structure will coarsen. Similarly, even when the heating temperature is more than 1250° C., the steel micro-structure will coarsen. On the other hand, if the heating temperature is less than 1100° C., or if the heating time period is less than 60 seconds, redissolution of the Ti carbo-nitrides will be insufficient.

As mentioned above, in the rough rolling process, because strain has been introduced into the Ti carbo-nitrides, it is possible to efficiently redissolve the Ti carbo-nitrides even by heating for a short time period, and it thus is possible to suppress coarsening of the micro-structure. With regard to the micro-structure after reheating, it is important that Ti carbo-nitrides having a grain size of more than 20 nm do not remain in the micro-structure.

In this regard, the present inventors conducted a preliminary investigation on the relationship between the heating time period and variations in Ti carbo-nitrides that precipitated in the final micro-structure. The steel used was steel S shown in Table 1 of the examples that are described later, and hot-rolled steel sheets were produced by setting various conditions for the average heating rate, the heating temperature and the heating time period in the sheet bar heating process. Note that, the average heating rate was 100° C./min or more, and the heating temperature was set within the range of 1100 to 1250° C. The conditions other than these conditions were the same as the conditions for a steel sheet Si shown in Table 2. The standard deviation of the diameter of Ti carbo-nitrides included in each obtained steel sheet was determined.

FIG. 1 is a graph illustrating the relation between the heating time period and the standard deviation of the diameter of Ti carbo-nitrides in the sheet bar heating process. As illustrated in FIG. 1, a tendency whereby the standard deviation of the diameter of the Ti carbo-nitrides decreases accompanying an increase in the heating time period is clearly recognized. In particular, it is found that it is possible to make the standard deviation of the diameter of the Ti carbo-nitrides 10 nm or less by setting the heating time period to 60 seconds or more.

(e) Finish Rolling Process

Within 20 seconds after the end of the sheet bar heating process, hot rolling of the sheet bar is performed under conditions of a start temperature within a range of 900 to 1250° C., an end temperature within a range of the $Ar_3$ point or more to less than 950° C., and a total rolling reduction of 50% or more. If the period of time from the end of the sheet bar heating process to the start of the finish rolling process is more than 20 seconds, not only will the micro-structure coarsen, but there is also a risk that the variations in the diameter of the precipitates will increase. Further, the start temperature depends on the heating temperature in the sheet bar heating process.

In addition, if the finishing temperature is less than the $Ar_3$ point, the micro-structure will become heterogeneous. On the other hand, if the finishing temperature is 950° C. or more, not only will it lead to a decrease in tensile strength due to coarsening of the micro-structure, but variations in the diameter of the precipitates will increase because ferrite transformation will be delayed in the cooling process, and differences in the timing of precipitation of Ti carbo-nitrides will increase. Further, variations in the grain size of ferrite will also increase in accompaniment therewith. By making the total rolling reduction 50% or more, fine and uniform recrystallized grains can be formed, and the crystal grain size of ferrite and bainite can be made small, and variations can also be made small. Note that the term "finish" in "finish rolling" does not in itself have any special meaning, and it suffices to subject the slab obtained by the slabbing process to hot rolling under the aforementioned conditions with respect to the start temperature, total rolling reduction and end temperature. In the present invention, the present process is referred to as a "finish rolling process" because the hot rolling is usually performed by a rolling mill called a "finish rolling mill".

Note that, in the present invention it is assumed that the $Ar_3$ point is determined by the following formula (ii):

$$Ar_3 \text{ point}=979.8-450.7\times C-125.7\times Mn+191.5\times Nb+340\times Ti+254\times Al-32.42\times Cr \qquad (ii)$$

where, each symbol of an element in the formula (ii) represents a content (mass %) of the corresponding element contained in the steel sheet.

(f) Cooling Process

After the finish rolling ends, cooling is conducted so that the steel micro-structure becomes a micro-structure that is mainly composed of ferrite and bainite. The cooling process is further subdivided into a primary cooling process, a slow cooling process and a secondary cooling process.

In the primary cooling process, the sheet bar is cooled from the aforementioned finishing temperature to within a temperature range of 600 to 750° C. at an average cooling rate of 60° C./s or more. If the cooling rate to the aforementioned temperature range is less than 60° C./s, there is a risk that the micro-structure will coarsen.

Subsequently, in the slow cooling process, at the stop temperature of the aforementioned primary cooling, slow cooling (for example, air-cooling) is performed at an average cooling rate of 0 to 10° C./s for 0 to 10 seconds. By performing slow cooling, it is possible to promote the production of ferrite. Note that, if the stop temperature of the primary cooling is less than 600° C., there is a risk that pearlite, which is detrimental to hole expandability, will be formed. On the other hand, if the stop temperature is more than 750° C., it will be difficult to obtain the effect of promoting ferrite production.

Note that, 0° C./s is also included in the range of the average cooling rate in the slow cooling process. That is, isothermal holding is also included in the slow cooling. In addition, the range of the cooling time period in the slow cooling process includes 0 seconds. That is, the slow cooling process may be omitted in a case where it is desired to suppress production of ferrite and increase the area fraction of bainite. The slow cooling time period may be appropriately selected according to the desired mechanical properties. Specifically, when importance is to be placed on hole expandability, it suffices to lengthen the slow cooling time period to thereby increase the area fraction of ferrite, and when importance is to be placed on toughness, it suffices to increase the area fraction of bainite by not performing slow cooling.

Next, in the secondary cooling process, cooling is performed from the end temperature of the slow cooling to a temperature which is equal to or less than a temperature that is 15° C. or more lower than the end temperature of the slow cooling and which is within a temperature range of 350 to 700° C., at an average cooling rate of 60° C./s or more. Formation of bainite is promoted by the secondary cooling. If the average cooling rate in the secondary cooling is less than 60° C./s, there is a risk that pearlite or cementite or the like will be formed, and the hole expandability will deteriorate.

Note that, as mentioned above, in a case where the slow cooling process is omitted, it suffices to perform primary cooling and secondary cooling consecutively, that is, it suffices to perform cooling from the aforementioned finishing temperature to a temperature range of 350 to 700° C. at an average cooling rate of 60° C./s or more. The secondary cooling is essential, and although the margin of decrease in the temperature (=slow cooling end temperature−secondary cooling stop temperature) of the steel sheet achieved by the secondary cooling is defined as 15° C. or more, it may be defined as 25° C. or more, 40° C. or more or 60° C. or more.

(g) Coiling Process

Thereafter, the cooled hot-rolled steel sheet is coiled. The conditions after the coiling process are not particularly limited.

6. Weld Joint

In general, a steel sheet used for the body structure of an automobile is sometimes welded and utilized as a weld joint. In such a case, a problem often arises that the low-temperature toughness decreases at a heat affected zone (hereunder, also referred to as "HAZ") of the weld joint. Therefore, the present inventors prepared weld joints using the hot-rolled steel sheet according to the present invention that is described above, and investigated the low-temperature toughness at a HAZ and a weld metal portion (hereunder, these are also referred to collectively as "weld zone"). As a result, the following findings were obtained.

(a) As mentioned above, the steel micro-structure of the hot-rolled steel sheet according to the present invention is mainly composed of ferrite and bainite. A weld metal portion produced by performing welding using a welding material with respect to such a steel sheet cools at a comparatively fast rate after welding. Therefore, the steel micro-structure thereof is a micro-structure in which the proportion of bainite is relatively high in comparison to the steel sheet.

(b) The steel micro-structure in a HAZ is an intermediate micro-structure between the steel sheet and the weld metal portion. If the steel micro-structure in the HAZ changes abruptly, the hardness difference will be large, which will cause the low-temperature toughness in the HAZ to noticeably deteriorate. Therefore, it is desirable for the steel micro-structure in the HAZ to change smoothly.

(c) As a result of the investigations carried out by the present inventors, the present inventors discovered that, although the reason is not clear, when welding is performed on a steel sheet in which variations in the grain size of ferrite and bainite in the micro-structure are small, changes in the steel micro-structure in the HAZ can be made smooth.

Hereunder, weld joints prepared using the hot-rolled steel sheet according to the present invention are described in detail.

(A) Overall Structure

Figure 2:
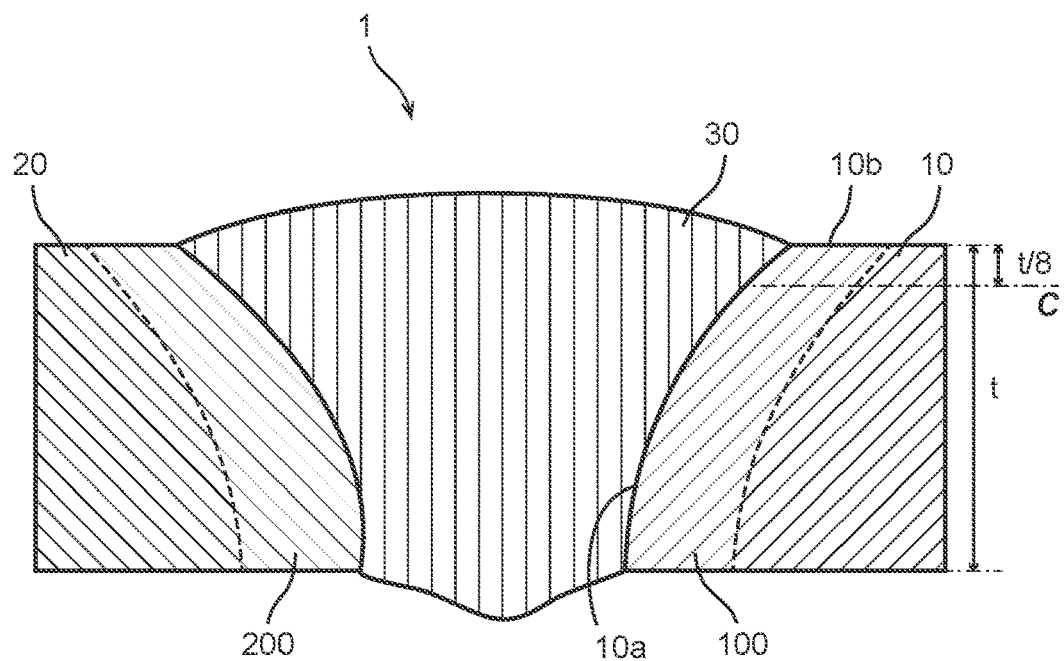
FIG. 2 is a view for describing the structure of a weld joint according to one embodiment of the present invention.

FIG. 2 is a view for describing the structure of a weld joint according to one embodiment of the present invention. As illustrated in FIG. 2, a weld joint 1 according to one embodiment of the present invention includes a first base metal portion 10, a second base metal portion 20 and a weld metal portion 30. The weld joint 1 having the structure illustrated in FIG. 2 is a butt joint groove-welded in a state in which the first base metal portion 10 and the second base metal portion 20 are butted together.

Figure 3:
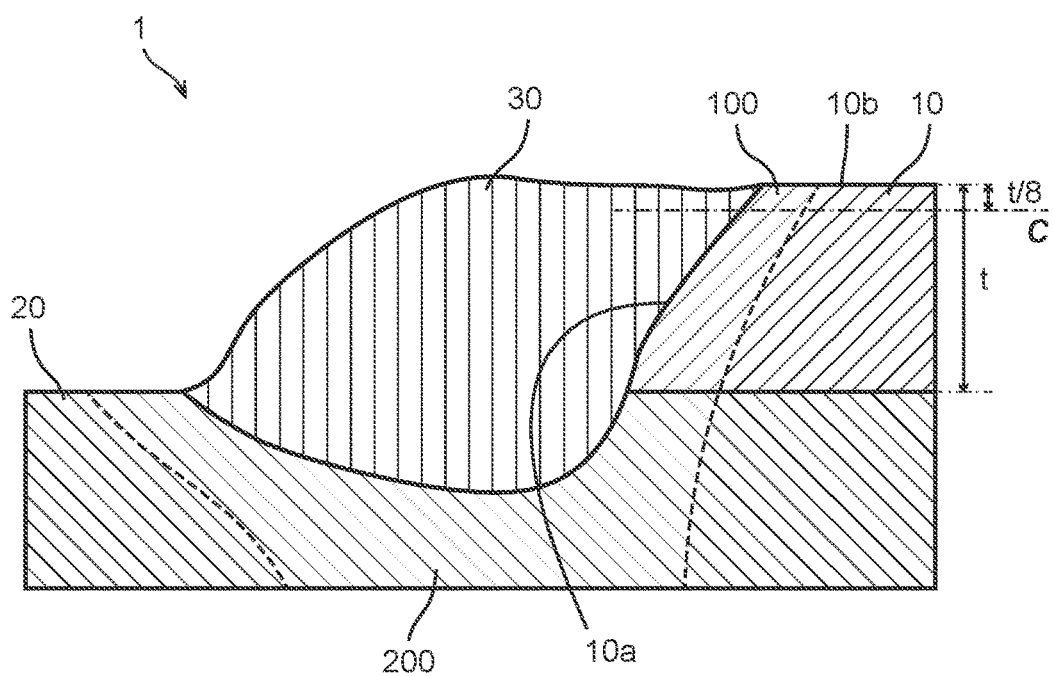
FIG. 3 is a view for describing the structure of a weld joint according to another embodiment of the present invention.

FIG. 3 is a view for describing the structure of a weld joint according to another embodiment of the present invention. A weld joint 1 having the structure illustrated in FIG. 3 is a lap joint fillet-welded in a state in which a first base metal portion 10 is superimposed on one side (upper side in FIG. 3) in the thickness direction of a second base metal portion 20.

A weld joint according to the present invention is not limited to these structures. It suffices that the weld joint has a structure in which the weld metal portion 30 is formed so as to extend in a first direction (direction perpendicular to the paper surface in FIG. 2) along an end portion 10a of the first base metal portion 10.

Further, as illustrated in FIGS. 2 and 3, a HAZ 100 and a HAZ 200 are formed in the vicinity of the boundaries between the first base metal portion 10 and the weld metal portion 30, and the second base metal portion 20 and the weld metal portion 30, respectively.

Figure 4:
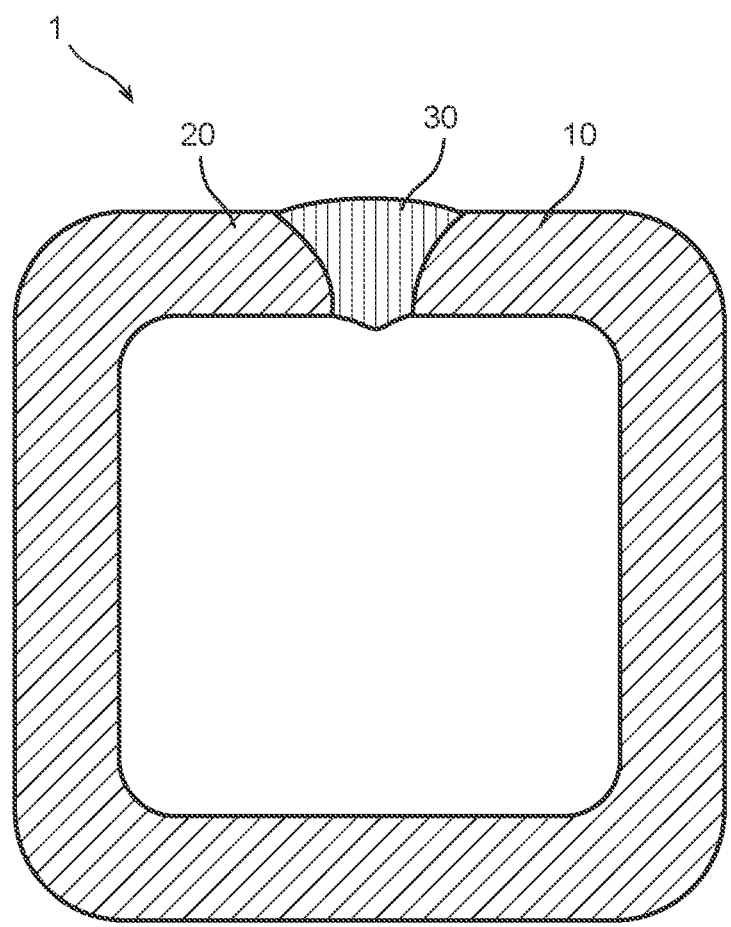
FIG. 4 is a view for describing the structure of a weld joint according to another embodiment of the present invention.

The first base metal portion 10 and the second base metal portion 20 may be made from different steel sheets, or as illustrated in FIG. 4, one steel sheet may be formed in an annular shape, with the two ends of the steel sheet being the first base metal portion 10 and the second base metal portion 20, respectively.

The hot-rolled steel sheet according to the present invention is used as the first base metal portion 10. That is, the first base metal portion 10 has the aforementioned chemical composition and steel micro-structure. Further, the hot-rolled steel sheet according to the present invention may also be used as the second base metal portion 20.

(B) Chemical Composition of Weld Metal Portion

The weld metal portion 30 has a chemical composition including, in mass %, C: 0.02 to 0.15%, Si: 0.01 to 1.50%, Mn: 0.10 to 1.50%, P: 0.10% or less, S: 0.010% or less, Al: 0.005 to 0.300%, Ti: 0.02 to 0.20%, N: 0.010% or less, Cu:

0 to 0.50%, Ni: 0 to 0.50%, Cr: 0 to 1.00%, Mo: 0 to 0.60%, Nb: 0 to 0.060%, V: 0 to 1.00%, B: 0 to 0.0100%, Ca: 0 to 0.0050%, O: 0.0010 to 0.0500%, and the balance: Fe and impurities.

The reasons for limiting each element are as follows. Note that, the symbol "%" with respect to content in the following description means "mass %".

C: 0.02 to 0.15%

C is an effective element for precipitating carbides and securing the strength of the weld metal portion. If the content of C is less than 0.02%, it is difficult to secure the desired strength. On the other hand, if the content of C is more than 0.15%, the low-temperature toughness of a HAZ and the weld metal portion decreases. Therefore, the content of C is set within the range of 0.02 to 0.15%. The content of C is preferably 0.03% or more, 0.04% or more, 0.05% or more, or 0.06% or more, and is preferably 0.14% or less, 0.12% or less, or 0.10% or less.

Si: 0.01 to 1.50%

Si is an element that has an effect that improves the strength of the weld metal portion. However, if the content of Si is excessive, a large amount of slag will be generated during welding, and the surface properties will deteriorate. Therefore, the content of Si is set within the range of 0.01 to 1.50%. The content of Si is preferably 0.05% or more, 0.10% or more, 0.20% or more, or 0.30% or more, and is preferably 1.40% or less, 1.20% or less, 1.00% or less, or 0.80% or less.

Mn: 0.10 to 1.50%

Mn is an effective element for securing the strength of a weld zone. However, if the content of Mn is excessive, microsegregation or macrosegregation is liable to occur, which will cause the low-temperature toughness of the weld metal portion to deteriorate. It will also cause the low-temperature toughness of a HAZ to deteriorate. Therefore, the content of Mn is set within the range of 0.10 to 1.50%. The content of Mn is preferably 0.20% or more, or 0.30% or more, and is preferably 1.2% or less.

P: 0.10% or less

P is an impurity, and if contained in a large amount it will cause the low-temperature toughness of the weld metal portion to deteriorate. Therefore, the content of P is set to 0.10% or less. The content of P is preferably 0.050% or less, or 0.020% or less.

S: 0.010% or less

S forms MnS and acts as a starting point of fractures, and noticeably reduces the low-temperature toughness of the weld metal portion. Therefore, the content of S is set to 0.010% or less. The content of S is preferably 0.0080% or less, or 0.0060% or less.

Al: 0.005 to 0.300%

Al is an element used for deoxidizing the steel. However, if the content of Al is excessive, inclusions will increase, which will cause the low-temperature toughness of the weld metal portion to deteriorate. Therefore, the content of Al is set within the range of 0.005 to 0.300%. The content of Al is preferably 0.010% or more, 0.015% or more, or 0.020% or more, and is preferably 0.200% or less, 0.100% or less, or 0.050% or less.

Ti: 0.02 to 0.20%

Ti causes TiC that are fine carbides to precipitate, and is an effective element for securing the strength of the weld metal portion. If the content of Ti is less than 0.02%, it will be difficult to secure the desired strength. On the other hand, if the content of Ti is more than 0.20%, the effect thereof will be saturated, and the economic efficiency will decrease. Therefore, the content of Ti is set within the range of 0.02 to 0.20%. The content of Ti is preferably 0.04% or more, 0.06% or more, or 0.08% or more, and is preferably 0.17% or less, 0.15% or less, or 0.13% or less.

N: 0.010% or less

N forms precipitates with Ti at a higher temperature than C, which decreases the low-temperature toughness of the weld metal portion. Therefore, the content of N is set to 0.010% or less. The content of N is preferably 0.008% or less, 0.006% or less, or 0.005% or less. Although from this viewpoint it is not necessary to set a lower limit for the content of N, reducing the content of N to less than 0.001% will increase the steel-making cost. Therefore, the content of N is preferably 0.001% or more, 0.002% or more, or 0.003% or more.

Cu: 0 to 0.50%

Cu has an effect that increases strength, and hence may be contained as necessary. However, if the content of Cu is excessive, Cu will segregate at crystal grain boundaries and become brittle. Therefore, the content of Cu is set to 0.50% or less. The content of Cu is preferably 0.40% or less, 0.30% or less, or 0.20% or less. To adequately obtain the aforementioned effect, the content of Cu is preferably 0.01% or more, 0.05% or more, or 0.10% or more.

Ni: 0 to 0.50%

Ni has an effect that increases strength and toughness, and hence may be contained as necessary. However, if the content of Ni is excessive, the strength will increase excessively, and the toughness will deteriorate due to a strength difference with respect to the steel sheet. Therefore, the content of Ni is set to 0.50% or less. The content of Ni is preferably 0.40% or less, 0.30% or less, or 0.20% or less. To adequately obtain the aforementioned effect, the content of Ni is preferably 0.01% or more, 0.05% or more, or 0.10% or more.

Cr: 0 to 1.00%
Mo: 0 to 0.60%
Nb: 0 to 0.060%
V: 0 to 1.00%

Cr, Mo, Nb and V contribute to improving the strength of the weld metal portion, and therefore, as necessary, one kind selected from these elements may be contained alone, or two or more kinds may be contained in combination. However, if any of these elements is excessively contained, a large amount of carbides will be formed, which will reduce the low-temperature toughness of the weld metal portion. Therefore, the content of Cr is set to 1.0% or less, the content of Mo is set to 0.60% or less, the content of Nb is set to 0.060% or less, and the content of V is set to 1.00% or less. The content of Cr is preferably 0.70% or less, the content of Mo is preferably 0.40% or less, the content of Nb is preferably 0.040% or less, and the content of V is preferably 0.60% or less. To adequately obtain the aforementioned effect, it is preferable to contain one or more kinds of element selected from Cr: 0.01% or more, Mo: 0.005% or more, Nb: 0.001% or more and V: 0.01% or more. Further, the content of Cr is preferably 0.10% or more, the content of Mo is preferably 0.050% or more, the content of Nb is preferably 0.005% or more, and the content of V is preferably 0.10% or more.

B: 0 to 0.0100%

B segregates at grain boundaries and has the effect of improving grain boundary strength, and hence may be contained as necessary. However, if the content of B is excessive, the effect will be saturated and economic efficiency will decrease. Therefore, the content of B is set to 0.0100% or less. The content of B is preferably 0.0020% or less. To adequately obtain the aforementioned effect, the content of B is preferably 0.0005% or more.

Ca: 0 to 0.0050%

Ca is an element that improves workability by controlling the morphology of non-metal inclusions that act as starting points of fractures and cause the workability to deteriorate, and hence may be contained as necessary. However, if the content of Ca is excessive, the effect will be saturated and economic efficiency will decrease. Therefore, the content of Ca is set to 0.0050% or less. The content of Ca is preferably 0.0030% or less. To adequately obtain the aforementioned effect, the content of Ca is preferably 0.0005% or more.

O: 0.0010 to 0.0500%

O unavoidably gets mixed in during welding. However, when contained in a large amount, there is a concern that O will form oxides with Al or Si, and the toughness will decrease. Therefore, the content of O is set within a range of 0.0010 to 0.0500%. The content of O is preferably 0.0300% or less, or 0.0100% or less.

The balance in the chemical composition of the weld metal portion of the present invention is Fe and impurities. Here, the term "impurities" refers to components which, during industrial production of the steel that is used for the base metal portion or a welding material to be described later, are mixed in from a raw material such as ore or scrap or due to various causes during the production processes, and which are allowed within a range that does not adversely affect the present invention.

Note that, the chemical composition of the weld metal portion is determined by the inflow ratio between the base metal portion and welding material during welding. For example, a commercially available solid wire prescribed in JIS Z 3312:2009 or flux cored wire prescribed in JIS Z 3313:2009 can be used as the welding material.

(C) Steel Micro-Structure of HAZ

As mentioned above, if the steel micro-structure in a HAZ changes abruptly, the hardness difference becomes large and the low-temperature toughness in the HAZ noticeably deteriorates. However, when welding is performed with respect to a steel sheet having the aforementioned chemical composition and steel micro-structure, changes in the steel micro-structure in a HAZ are smooth.

In the present invention the phrase "changes in the steel micro-structure in a HAZ are smooth" means, specifically, that the following requirements are satisfied. This is described in detail hereunder.

A plane C indicated by a dashed line in FIGS. 2 and 3 is a cross-section which is parallel to a surface 10b on one side in the thickness direction of the first base metal portion 10 and which is at a position that is at a distance equivalent to ⅛ t in the thickness direction from the surface 10b. Note that, "t" represents the thickness of the steel sheet used for the first base metal portion 10.

Figure 5:
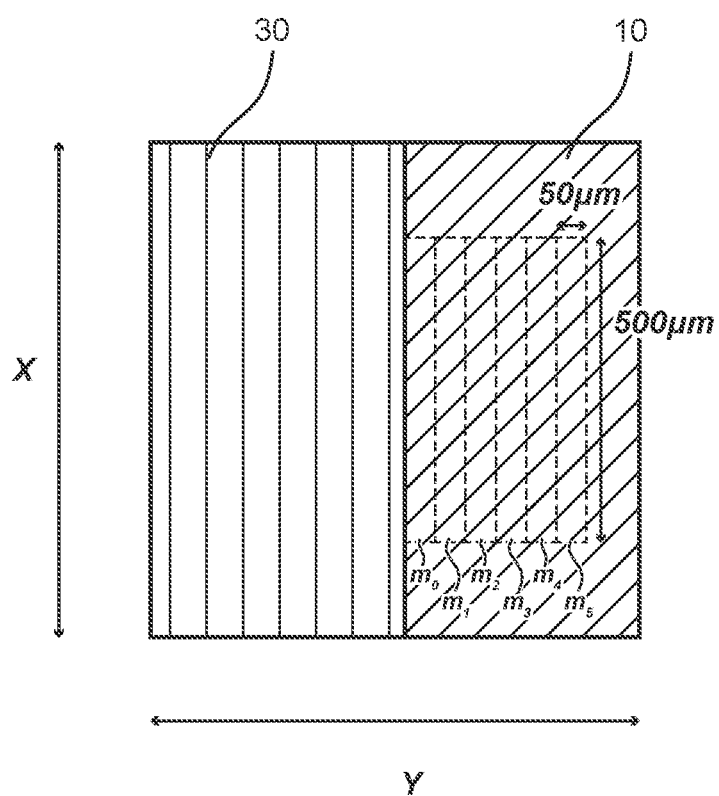
FIG. 5 is a view schematically illustrating a cross-section parallel to a surface of a weld joint according to another embodiment of the present invention.

Further, FIG. 5 is a view of the plane C as viewed from the thickness direction of the first base metal portion 10. An X-direction shown in FIG. 5 is a first direction that is the direction in which the weld metal portion 30 extends, and a Y-direction is a direction that is perpendicular to the first direction when viewed from the thickness direction of the first base metal portion 10. On the plane C, the area fraction (%) of bainite is measured in order at a pitch of 50 μm from the boundary between the first base metal portion 10 and the weld metal portion 30 toward the first base metal portion 10 side (right side of the paper surface) in the Y-direction.

In the example illustrated in FIG. 5, regions of 50 μm in the Y-direction and 500 μm in the X direction are extracted at a pitch of 50 μm from the boundary between the first base metal portion 10 and the weld metal portion 30, and the area fraction (%) of bainite in each of these regions is measured. The area fractions (%) of bainite that were measured in order are denoted by reference characters $m_0$, $m_1$, $m_2$, $m_3$, $m_4$ and $m_5$.

At such time, the phrase "changes in the steel micro-structure in a HAZ are smooth" means that $m_0$, $m_1$, $m_2$, $m_3$, $m_4$ and $m_5$ each satisfy the following formula (i). That is, the value of $m_{n-1}-m_n$ which is the amount of change in the area fraction of bainite between regions adjacent to each other at a pitch of 50 μm is 20 or less. Note that, as mentioned above, because rapid cooling is performed to a progressively greater degree in the direction toward the weld metal portion 30 side, the area fraction of bainite increases progressively toward the weld metal portion 30 side. Therefore, the value of $m_{n-1}-m_n$ is more than 0. By satisfying the formula (i), it is possible to secure excellent low-temperature toughness in the weld zone.

$$0<m_{n-1}-m_n\leq 20 \qquad (i)$$

where, n in the above formula is a natural number from 1 to 5.

Note that, the weld joint according to the present invention can be produced by performing welding using a solid wire prescribed in JIS Z 3312:2009 or a flux cored wire prescribed in JIS Z 3313:2009 with respect to the hot-rolled steel sheet described above. The welding method is not particularly limited, and for example groove welding may be performed in a state in which the first base metal portion 10 and the second base metal portion 20 are butted together, or fillet welding may be performed in a state in which the first base metal portion 10 is superimposed on one side in the thickness direction of the second base metal portion 20.

Note that, the welding may be performed by adopting common conditions as the welding conditions, and for example, gas-shielded arc welding is used. In this case, the current value, voltage value, welding speed and shielding gas used for welding can be appropriately selected from known techniques.

Hereunder, the present invention is described more specifically by way of examples, although the present invention is not limited to these examples.

Example 1

Steels having the chemical compositions shown in Table 1 were melted, cast into slabs by thin slab continuous casting, and thereafter were hot-rolled, cooled and then coiled under the conditions shown in Table 2 to produce hot-rolled steel sheets, which were used as test materials.

TABLE 1

| | Chemical composition (in mass %, balance: Fe and impurities) | | | | | | | | | | | | | | | | |
|---|---|---|---|---|---|---|---|---|---|---|---|---|---|---|---|---|---|
| Steel | C | Si | Mn | P | S | Al | Ti | N | Cu | Ni | Cr | Mo | Nb | V | B | Ca | O |
| A | 0.08 | 1.10 | 1.40 | 0.013 | 0.004 | 0.015 | 0.16 | 0.005 | — | — | — | — | — | — | — | — | 0.0048 |
| B | 0.09 | 0.40 | 1.60 | 0.011 | 0.003 | 0.038 | 0.10 | 0.004 | — | — | — | — | 0.023 | — | — | — | 0.0036 |

TABLE 1-continued

| | Chemical composition (in mass %, balance: Fe and impurities) | | | | | | | | | | | | | | | | |
|---|---|---|---|---|---|---|---|---|---|---|---|---|---|---|---|---|---|
| Steel | C | Si | Mn | P | S | Al | Ti | N | Cu | Ni | Cr | Mo | Nb | V | B | Ca | O |
| C | 0.07 | 0.50 | 1.00 | 0.012 | 0.003 | 0.043 | 0.12 | 0.004 | — | — | 0.55 | — | — | — | — | — | 0.0092 |
| D | 0.04 | 0.80 | 0.90 | 0.008 | 0.001 | 0.044 | 0.13 | 0.003 | — | — | — | — | 0.30 | — | — | — | 0.0046 |
| E | 0.15 | 0.40 | 1.50 | 0.009 | 0.005 | 0.033 | 0.10 | 0.003 | — | — | — | — | — | — | 0.0020 | — | 0.0093 |
| F | 0.07 | 1.10 | 1.70 | 0.011 | 0.006 | 0.041 | 0.07 | 0.004 | — | — | — | — | — | — | — | 0.0023 | 0.0047 |
| G | 0.05 | 0.30 | 2.10 | 0.012 | 0.004 | 0.013 | 0.15 | 0.004 | — | — | — | — | 0.015 | — | 0.0013 | — | 0.0036 |
| H | 0.06 | 0.60 | 0.80 | 0.015 | 0.004 | 0.016 | 0.06 | 0.003 | — | — | 0.35 | — | — | 0.20 | — | — | 0.0041 |
| I | 0.05 | 0.50 | 1.80 | 0.008 | 0.004 | 0.026 | 0.08 | 0.005 | — | — | — | — | 0.020 | — | 0.0010 | — | 0.0067 |
| J | 0.12 | 0.40 | 1.20 | 0.013 | 0.006 | 0.048 | 0.10 | 0.003 | — | — | — | — | 0.018 | — | — | 0.0032 | 0.0070 |
| K | 0.12 | 0.30 | 1.20 | 0.012 | 0.002 | 0.044 | 0.11 | 0.003 | — | — | — | — | 0.008 | — | — | 0.0028 | 0.0047 |
| L | 0.04 | 0.80 | 1.40 | 0.009 | 0.004 | 0.032 | 0.13 | 0.003 | — | — | 0.44 | — | — | — | 0.0018 | — | 0.0080 |
| M | 0.04 | 1.10 | 1.60 | 0.012 | 0.003 | 0.023 | 0.13 | 0.004 | — | — | — | — | — | 0.25 | 0.0021 | — | 0.0086 |
| N | 0.07 | 0.10 | 1.20 | 0.015 | 0.005 | 0.022 | 0.09 | 0.003 | — | — | 0.60 | — | — | — | — | 0.0022 | 0.0032 |
| O | 0.06 | 1.10 | 1.10 | 0.008 | 0.004 | 0.031 | 0.09 | 0.005 | — | — | — | — | — | 0.42 | — | 0.0030 | 0.0035 |
| P | 0.13 | 0.70 | 0.80 | 0.014 | 0.004 | 0.045 | 0.14 | 0.005 | — | — | 0.58 | — | 0.022 | — | — | — | 0.0044 |
| Q | 0.14 | 0.30 | 1.50 | 0.012 | 0.003 | 0.032 | 0.12 | 0.004 | 0.20 | — | — | — | — | — | — | — | 0.0086 |
| R | 0.08 | 0.80 | 1.80 | 0.013 | 0.003 | 0.028 | 0.16 | 0.004 | — | 0.35 | — | — | — | — | — | — | 0.0053 |
| S | 0.11 | 0.70 | 0.95 | 0.011 | 0.002 | 0.031 | 0.06 | 0.002 | — | — | — | 0.20 | — | — | — | — | 0.0047 |
| T | 0.23 | 0.30 | 1.40 | 0.012 | 0.002 | 0.032 | 0.08 | 0.006 | — | — | — | — | — | — | — | — | 0.0067 |
| U | 0.09 | 0.10 | 3.20 | 0.009 | 0.005 | 0.029 | 0.13 | 0.003 | — | — | — | — | — | — | — | — | 0.0051 |

TABLE 2

| | | Slabbing process | | | Rough rolling process | | | | Sheet bar heating process | | | | Finish rolling process | |
|---|---|---|---|---|---|---|---|---|---|---|---|---|---|---|
| | | Temp. before heating (° C.) | Heating temp. (° C.) | Ar₃ (° C.) | Start temp. (° C.) | End temp. (° C.) | Total rolling reduction (%) | Average heating rate (° C./min) | Heating temp. (° C.) | Heating time (s) | Holding time (s) | | Start temp. (° C.) | End temp. (° C.) |
| Steel sheet | Steel | | | | | | | | | | | | | |
| A1 | A | — | — | 826 | 989 | 875 | 64 | 148 | 1113 | 96 | 17 | | 1112 | 837 |
| A2 | | — | — | 826 | 844 | 809 | 63 | 182 | 1187 | 125 | 20 | | 1186 | 866 |
| A3 | | — | — | 826 | 1021 | 944 | 61 | 183 | 1157 | 70 | 16 | | 1156 | 861 |
| A4 | | — | — | 826 | 1139 | 1026 | 81 | 129 | 1206 | 84 | 13 | | 1205 | 870 |
| B1 | B | — | — | 786 | 1072 | 973 | 63 | 112 | 1164 | 102 | 6 | | 1164 | 848 |
| B2 | | — | — | 786 | 1101 | 1006 | 69 | 170 | 1228 | 78 | 4 | | 1228 | 846 |
| B3 | | — | — | 786 | 1080 | 1016 | 88 | 126 | 1157 | 67 | 16 | | 1157 | 936 |
| C1 | C | — | — | 857 | 861 | 811 | 85 | 197 | 1212 | 122 | 11 | | 1211 | 934 |
| C2 | | — | — | 857 | 1062 | 949 | 83 | 128 | 1156 | 97 | 18 | | 1156 | 886 |
| C3 | | — | — | 857 | 1029 | 998 | 69 | 105 | 1206 | 119 | 8 | | 1206 | 903 |
| D1 | D | — | — | 904 | 1110 | 1022 | 77 | 120 | 1198 | 88 | 10 | | 1198 | 937 |
| D2 | | — | — | 904 | 915 | 874 | 83 | 112 | 1179 | 163 | 11 | | 1178 | 909 |
| D3 | | — | — | 904 | 1041 | 923 | 62 | 140 | 1155 | 99 | 10 | | 1155 | 909 |
| E1 | E | — | — | 766 | 963 | 880 | 61 | 196 | 1119 | 73 | 18 | | 1119 | 917 |
| E2 | | — | — | 766 | 922 | 814 | 90 | 144 | 1137 | 135 | 13 | | 1137 | 893 |
| E3 | | — | — | 766 | 929 | 760 | 71 | 116 | 1106 | 179 | 14 | | 1105 | 934 |
| F1 | F | — | — | 769 | 1085 | 1001 | 85 | 197 | 1191 | 58 | 18 | | 1191 | 868 |
| F2 | | — | — | 769 | 883 | 850 | 83 | 129 | 1164 | 146 | 6 | | 1163 | 937 |
| F3 | | — | — | 769 | 1107 | 989 | 80 | 150 | 1176 | 75 | 15 | | 1176 | 866 |
| G1 | G | — | — | 751 | 1035 | 961 | 76 | 187 | 1280 | 102 | 4 | | 1280 | 817 |
| G2 | | — | — | 751 | 1055 | 952 | 89 | 131 | 1220 | 123 | 7 | | 1220 | 751 |
| G3 | | — | — | 751 | 1052 | 1018 | 73 | 108 | 1217 | 111 | 11 | | 1217 | 781 |
| H1 | H | — | — | 865 | 949 | 904 | 66 | 85 | 1197 | 207 | 15 | | 1195 | 877 |
| H2 | | — | — | 865 | 1027 | 989 | 80 | 196 | 1149 | 49 | 9 | | 1149 | 1030 |
| H3 | | — | — | 865 | 869 | 830 | 61 | 114 | 1201 | 195 | 7 | | 1199 | 920 |
| I1 | I | — | — | 769 | 944 | 824 | 71 | 150 | 1105 | 112 | 12 | | 1105 | 850 |
| I2 | | — | — | 769 | 1067 | 1019 | 70 | 173 | 1030 | 4 | 1 | | 1030 | 786 |
| I3 | | — | — | 769 | 1013 | 960 | 74 | 144 | 1164 | 85 | 25 | | 1164 | 885 |
| J1 | J | — | — | 825 | 1057 | 1011 | 82 | 125 | 1189 | 85 | 6 | | 1189 | 931 |
| J2 | | — | — | 825 | 856 | 820 | 75 | 106 | 1111 | 165 | 17 | | 1111 | 946 |
| J3 | | — | — | 825 | 1000 | 650 | 75 | 161 | 1180 | 198 | 17 | | 1180 | 882 |
| K1 | K | — | — | 825 | 937 | 887 | 74 | 132 | 1108 | 100 | 5 | | 1107 | 876 |
| K2 | | — | — | 825 | 1120 | 1023 | 65 | 135 | 1164 | 63 | 2 | | 1164 | 829 |
| K3 | | — | — | 825 | 1029 | 955 | 70 | — | — | — | — | | — | 853 |
| L1 | L | — | — | 824 | 943 | 839 | 69 | 191 | 1153 | 99 | 16 | | 1153 | 863 |
| L2 | | — | — | 824 | 949 | 893 | 74 | 176 | 1214 | 109 | 2 | | 1214 | 871 |
| M1 | M | — | — | 811 | 969 | 908 | 66 | 163 | 1138 | 85 | 3 | | 1138 | 839 |
| M2 | | — | — | 811 | 958 | 906 | 78 | 196 | 1229 | 99 | 1 | | 1229 | 909 |
| N1 | N | — | — | 814 | 969 | 850 | 90 | 122 | 1123 | 134 | 20 | | 1122 | 909 |
| N2 | | — | — | 814 | 1057 | 941 | 81 | 131 | 1207 | 122 | 18 | | 1207 | 900 |
| O1 | O | — | — | 853 | 1072 | 1029 | 88 | 108 | 1186 | 87 | 3 | | 1186 | 872 |
| O2 | | — | — | 853 | 1120 | 1026 | 87 | 106 | 1135 | 62 | 12 | | 1135 | 927 |

TABLE 2-continued

| | | | | | | | | | | | | | | |
|---|---|---|---|---|---|---|---|---|---|---|---|---|---|---|
| P1 | P | — | — | 865 | 1011 | 966 | 90 | 121 | 1178 | 105 | 13 | 1178 | 918 |
| P2 | | — | — | 865 | 934 | 900 | 65 | 109 | 1108 | 114 | 5 | 1108 | 880 |
| P3 | | — | — | 865 | 1029 | 811 | 77 | 102 | 1241 | 252 | 7 | 1239 | 876 |
| P4 | | — | — | 865 | 963 | 1068 | 88 | 53 | 1197 | 146 | 11 | 1196 | 939 |
| Q1 | Q | — | — | 777 | 960 | 891 | 74 | 146 | 1112 | 91 | 1 | 1112 | 852 |
| R1 | R | — | — | 779 | 1023 | 951 | 80 | 149 | 1108 | 63 | 12 | 1108 | 856 |
| S1 | S | 891 | 1201 | 839 | 993 | 950 | 69 | 135 | 1110 | 71 | 14 | 1110 | 888 |
| S2 | | — | — | 839 | 1020 | 953 | 14 | 122 | 1123 | 84 | 8 | 1123 | 909 |
| S3 | | — | — | 839 | 954 | 951 | 66 | 190 | 1112 | 51 | 15 | 1112 | 884 |
| T1 | T | — | — | 736 | 924 | 867 | 89 | 110 | 1207 | 185 | 7 | 1207 | 945 |
| U1 | U | — | — | 589 | 878 | 838 | 78 | 110 | 1185 | 189 | 9 | 1185 | 944 |

| | Finish rolling process Total rolling reduction (%) | Cooling process | | | | | | |
|---|---|---|---|---|---|---|---|---|
| | | Primary cooling | | Slow cooling | | | Secondary cooling | |
| Steel sheet | | Cooling rate (°C./s) | Stop temp. (°C.) | Cooling rate (°C./s) | Cooling time (s) | End temp. (°C.) | Cooling rate (°C./s) | Stop temp. (°C.) |
| A1 | 98 | 190 | 742 | 5 | 5 | 717 | 264 | 596 |
| A2 | 98 | 72 | 652 | 2 | 7 | 638 | 269 | 472 |
| A3 | 98 | 213 | 709 | 4 | 7 | 681 | 141 | 430 |
| A4 | 96 | 101 | 694 | 0 | 0 | 694 | 296 | 546 |
| B1 | 98 | 214 | 693 | 2 | 8 | 677 | 299 | 280 |
| B2 | 97 | 133 | 701 | 6 | 1 | 695 | 226 | 464 |
| B3 | 90 | 144 | 667 | 6 | 3 | 649 | 166 | 615 |
| C1 | 91 | 123 | 670 | 10 | 6 | 610 | 66 | 465 |
| C2 | 93 | 86 | 608 | 2 | 7 | 594 | 242 | 477 |
| C3 | 98 | 67 | 701 | 0 | 0 | 701 | 242 | 437 |
| D1 | 95 | 153 | 685 | 0 | 2 | 685 | 127 | 473 |
| D2 | 93 | 128 | 698 | 0 | 7 | 698 | 112 | 457 |
| D3 | 97 | 75 | 626 | 7 | 8 | 570 | 288 | 458 |
| E1 | 97 | 126 | 646 | 8 | 3 | 622 | 88 | 459 |
| E2 | 88 | 71 | 638 | 9 | 3 | 611 | 221 | 594 |
| E3 | 96 | 153 | 669 | 4 | 8 | 637 | 245 | 419 |
| F1 | 92 | 170 | 659 | 10 | 4 | 619 | 209 | 425 |
| F2 | 93 | 121 | 609 | 5 | 6 | 579 | 128 | 417 |
| F3 | 94 | 95 | 731 | 6 | 9 | 677 | 108 | 529 |
| G1 | 95 | 220 | 697 | 10 | 6 | 637 | 183 | 446 |
| G2 | 89 | 220 | 698 | 8 | 4 | 666 | 42 | 475 |
| G3 | 97 | 114 | 670 | 2 | 15 | 640 | 296 | 478 |
| H1 | 97 | 111 | 736 | 7 | 6 | 694 | 291 | 430 |
| H2 | 95 | 186 | 660 | 1 | 7 | 653 | 69 | 423 |
| H3 | 95 | 89 | 728 | 0 | 4 | 728 | 79 | 659 |
| I1 | 97 | 195 | 651 | 1 | 7 | 644 | 293 | 453 |
| I2 | 97 | 162 | 716 | 0 | 0 | 716 | 219 | 697 |
| I3 | 98 | 202 | 717 | 9 | 7 | 658 | 130 | 507 |
| J1 | 95 | 186 | 713 | 10 | 9 | 623 | 165 | 434 |
| J2 | 98 | 87 | 667 | 9 | 9 | 586 | 196 | 480 |
| J3 | 96 | 142 | 695 | 3 | 3 | 683 | 126 | 645 |
| K1 | 97 | 93 | 697 | 7 | 8 | 641 | 268 | 554 |
| K2 | 97 | 78 | 739 | 0 | 4 | 739 | 164 | 715 |
| K3 | 97 | 86 | 718 | 4 | 6 | 690 | 216 | 635 |
| L1 | 97 | 156 | 683 | 6 | 4 | 659 | 91 | 643 |
| L2 | 96 | 121 | 581 | 1 | 9 | 572 | 142 | 508 |
| M1 | 96 | 218 | 720 | 7 | 4 | 692 | 95 | 579 |
| M2 | 96 | 53 | 664 | 5 | 1 | 659 | 271 | 505 |
| N1 | 91 | 78 | 689 | 4 | 10 | 649 | 225 | 458 |
| N2 | 95 | 128 | 707 | 0 | 2 | 707 | 161 | 646 |
| O1 | 95 | 201 | 762 | 0 | 7 | 762 | 92 | 622 |
| O2 | 95 | 97 | 726 | 9 | 3 | 699 | 262 | 572 |
| P1 | 93 | 149 | 605 | 6 | 1 | 599 | 240 | 481 |
| P2 | 98 | 161 | 669 | 7 | 2 | 655 | 291 | 385 |
| P3 | 97 | 186 | 667 | 9 | 3 | 586 | 69 | 554 |
| P4 | 95 | 87 | 685 | 1 | 4 | 659 | 271 | 481 |
| Q1 | 97 | 149 | 698 | 1 | 4 | 696 | 97 | 603 |
| R1 | 93 | 181 | 693 | 4 | 6 | 661 | 126 | 528 |
| S1 | 99 | 145 | 699 | 6 | 5 | 642 | 63 | 537 |
| S2 | 99 | 78 | 689 | 4 | 10 | 649 | 225 | 458 |
| S3 | 98 | 161 | 649 | 5 | 5 | 633 | 191 | 456 |
| T1 | 94 | 199 | 658 | 3 | 7 | 637 | 243 | 414 |
| U1 | 97 | 108 | 694 | 9 | 1 | 685 | 141 | 466 |

[Steel Micro-Structure]

Observation of the steel micro-structure of the obtained test materials was performed, and the average and the standard deviation of the crystal grain sizes of ferrite and bainite as well as the average and the standard deviation of the diameter of Ti carbo-nitrides were respectively determined by the procedures described above. Note that, it was confirmed from the results of analysis by an EBSD mounted on the SEM that retained austenite was not observed in any of the steel sheets.

[Mechanical Properties]

Among the mechanical properties, tensile strength properties (tensile strength (TS), and total elongation (EL)) were evaluated in conformity with JIS Z 2241:2011 using a No. 5 test coupon specified in JIS Z 2241:2011 which, when the sheet width is represented by "W", was taken from a position at a distance equivalent to ¼ W or ¾ W from one end of the sheet in the sheet width direction, with a direction (width direction) perpendicular to the rolling direction being taken as the longitudinal direction.

The hole expansion ratio was evaluated in conformity with a test method described in JIS Z 2256:2010 using a test specimen taken from a similar position to the position where the tensile test specimen was taken. Further, the toughness was evaluated by performing a C-direction-notch Charpy impact test at −40° C. using a 2.5 mm subsize V-notch test specimen defined in JIS Z 2242:2018. Further, for test specimens for which the final thickness of the steel sheet was less than 2.5 mm, the overall thickness was measured.

A summary of the observation results for the steel micro-structures and the measurement results for the mechanical properties is shown in Table 3.

TABLE 3

| | | | | Steel micro-structure | | | | | | |
|---|---|---|---|---|---|---|---|---|---|---|
| | | | | | | | Ferrite + bainite | | Ti carbo-nitrides | |
| Test No. | Steel sheet | Steel | Sheet thickness (mm) | Ferrite (area %) | Bainite (area %) | Ferrite + bainite (area %) | Average grain size (μm) | Standard deviation of grain size (μm) | Average diameter (nm) | Standard deviation of diameter (nm) |
|---|---|---|---|---|---|---|---|---|---|---|
| 1 | A1 | A | 1.2 | 77 | 13 | 90 | 6.2 | 1.2 | 25 | 5.6 |
| 2 | A2 | | 1.2 | 66 | 31 | 97 | 5.1 | 1.1 | 7 | 1.7 |
| 3 | A3 | | 1.2 | 80 | 20 | 100 | 1.4 | 0.3 | 26 | 5.7 |
| 4 | A4 | | 1.2 | 74 | 21 | 95 | 1.7 | 0.4 | 6 | 1.4 |
| 5 | B1 | B | 1.2 | 53 | 25 | 78 | 1.5 | 0.3 | 15 | 2.8 |
| 6 | B2 | | 1.2 | 74 | 19 | 93 | 2.5 | 0.5 | 24 | 6.7 |
| 7 | B3 | | 2.9 | 71 | 19 | 90 | 6.2 | 1.3 | 16 | 3.6 |
| 8 | C1 | C | 2.9 | 71 | 23 | 94 | 5.0 | 1.1 | 15 | 2.7 |
| 9 | C2 | | 2.9 | 74 | 17 | 91 | 4.2 | 0.9 | 21 | 3.8 |
| 10 | C3 | | 2.9 | 71 | 29 | 100 | 6.3 | 1.5 | 19 | 4.9 |
| 11 | D1 | D | 2.9 | 78 | 14 | 92 | 5.7 | 1.2 | 18 | 4.5 |
| 12 | D2 | | 2 9 | 76 | 18 | 94 | 2.8 | 0.8 | 24 | 4.9 |
| 13 | D3 | | 2.9 | 71 | 22 | 93 | 4.4 | 1.0 | 28 | 5.3 |
| 14 | E1 | E | 2.9 | 70 | 20 | 90 | 2.4 | 0.6 | 9 | 1.7 |
| 15 | E2 | | 2.9 | 71 | 24 | 95 | 3.5 | 0.8 | 19 | 4.0 |
| 16 | E3 | | 2.9 | 70 | 25 | 95 | 6.1 | 4.2 | 35 | 11.2 |
| 17 | F1 | F | 2.9 | 75 | 18 | 93 | 5.1 | 1.0 | 21 | 4.1 |
| 18 | F2 | | 2.9 | 71 | 22 | 93 | 3.7 | 0.7 | 19 | 3.7 |
| 19 | F3 | | 2.9 | 80 | 31 | 91 | 6.8 | 1.3 | 21 | 4.7 |
| 20 | G1 | G | 2.9 | 79 | 13 | 92 | 8.2 | 2.3 | 19 | 3.9 |
| 21 | G2 | | 2.9 | 43 | 19 | 62 | 4.6 | 1.2 | 14 | 3.2 |
| 22 | G3 | | 2.3 | 95 | 5 | 100 | 2.7 | 0.7 | 16 | 4.0 |
| 23 | H1 | H | 2.3 | 76 | 20 | 96 | 9.5 | 4.1 | 16 | 4.0 |
| 24 | H2 | | 2.3 | 67 | 24 | 91 | 8.7 | 3.8 | 24 | 13.2 |
| 25 | H3 | | 2.3 | 74 | 24 | 98 | 3.6 | 0.9 | 14 | 3.0 |
| 26 | I1 | I | 2.3 | 74 | 16 | 96 | 3.2 | 0.7 | 22 | 5.6 |
| 27 | I2 | | 2.3 | 78 | 14 | 92 | 3.2 | 2.1 | 42 | 12.3 |
| 28 | I3 | | 2.3 | 73 | 23 | 96 | 8.3 | 2.2 | 35 | 15.2 |
| 29 | J1 | J | 2.3 | 78 | 20 | 98 | 6.0 | 1.3 | 16 | 3.3 |
| 30 | J2 | | 2.3 | 70 | 27 | 97 | 4.0 | 1.0 | 17 | 3.3 |
| 31 | J3 | | 2.3 | 63 | 14 | 77 | 6.0 | 2.2 | 51 | 16.2 |
| 32 | K1 | K | 2 3 | 75 | 25 | 100 | 6.7 | 1.8 | 28 | 5.1 |
| 33 | K2 | | 2.3 | 88 | 0 | 88 | 2.9 | 0.8 | 9 | 1.8 |
| 34 | K3 | | 2.6 | 79 | 19 | 98 | 7.3 | 2.5 | 27 | 13.2 |
| 35 | L1 | L | 2.3 | 76 | 19 | 95 | 4.3 | 0.9 | 26 | 5.9 |
| 36 | L2 | | 2.3 | 42 | 23 | 65 | 5.6 | 1.0 | 25 | 5.7 |
| 37 | M1 | M | 2.3 | 80 | 12 | 92 | 2.4 | 0.5 | 19 | 5.4 |
| 38 | M2 | | 2.3 | 71 | 27 | 98 | 9.3 | 4.3 | 11 | 2.1 |
| 39 | N1 | N | 2.3 | 79 | 31 | 90 | 4.9 | 1.3 | 15 | 3.6 |
| 40 | N2 | | 1.6 | 75 | 17 | 92 | 4.9 | 1.4 | 23 | 6.1 |
| 41 | O1 | O | 1.6 | 55 | 45 | 100 | 4.1 | 0.8 | 22 | 4.1 |
| 42 | O2 | | 1.6 | 76 | 23 | 99 | 1.9 | 0.4 | 14 | 2.6 |
| 43 | P1 | P | 1.6 | 67 | 29 | 96 | 4.8 | 1.3 | 20 | 4.3 |
| 44 | P2 | | 1.6 | 73 | 27 | 100 | 5.9 | 1.1 | 18 | 4.7 |
| 45 | P3 | | 1.6 | 74 | 24 | 98 | 5.1 | 0.8 | 60 | 9.0 |
| 46 | P4 | | 1.6 | 75 | 17 | 92 | 6.3 | 2.8 | 35 | 15.0 |
| 47 | Q1 | Q | 1.8 | 73 | 26 | 99 | 4.4 | 0.9 | 28 | 5.2 |
| 48 | R1 | R | 1.8 | 72 | 28 | 100 | 5.5 | 1.5 | 33 | 8.2 |
| 49 | S1 | S | 1.8 | 74 | 15 | 89 | 5.4 | 1.4 | 35 | 8.5 |
| 50 | S2 | | 1.8 | 80 | 13 | 93 | 10.2 | 3.4 | 35 | 11.2 |

TABLE 3-continued

| 51 | S3 |   | 1.6 | 73 | 24 | 97 | 9.8 | 4.2 | 22 | 12.1 |
| 52 | T1 | T | 1.6 | 67 | 31 | 98 | 6.5 | 1.9 | 27 | 5.5 |
| 53 | U1 | U | 1.6 | 73 | 18 | 91 | 1.5 | 0.4 | 14 | 2.5 |

| Test No. | TS (MPa) | El (%) | TS × $\lambda^{0.5}$ (MPa·$\%^{0.5}$) | Impact absorbed enemy at −40° C. (J/cm$^2$) | |
|---|---|---|---|---|---|
| 1 | 875 | 18 | 7162 | 295 | Inventive |
| 2 | 1048 | 13 | 10739 | 238 | example |
| 3 | 1123 | 13 | 10654 | 227 | |
| 4 | 1053 | 14 | 11439 | 255 | |
| 5 | 1012 | 15 | 8159 | 125 | Comp. ex |
| 6 | 1117 | 12 | 9865 | 291 | Inventive |
| 7 | 893 | 18 | 9451 | 247 | example |
| 8 | 914 | 20 | 7312 | 253 | |
| 9 | 1063 | 13 | 9082 | 267 | |
| 10 | 1053 | 14 | 11487 | 272 | |
| 11 | 1086 | 12 | 11390 | 235 | |
| 12 | 967 | 15 | 7675 | 162 | |
| 13 | 1133 | 12 | 9135 | 227 | |
| 14 | 950 | 19 | 10009 | 153 | |
| 15 | 939 | 19 | 8240 | 161 | |
| 16 | 877 | 20 | 5822 | 111 | Comp. ex |
| 17 | 1045 | 14 | 9859 | 233 | Inventive |
| 18 | 987 | 16 | 9968 | 166 | example |
| 19 | 893 | 21 | 8795 | 253 | |
| 20 | 960 | 16 | 10340 | 132 | Comparative |
| 21 | 823 | 21 | 5738 | 236 | example |
| 22 | 960 | 17 | 8587 | 142 | |
| 23 | 1136 | 13 | 11969 | 134 | |
| 24 | 778 | 28 | 5733 | 142 | |
| 25 | 840 | 23 | 8770 | 240 | Inventive |
| 26 | 1104 | 12 | 11204 | 205 | example |
| 27 | 837 | 23 | 5158 | 144 | Comparative |
| 28 | 992 | 17 | 5381 | 137 | example |
| 29 | 831 | 25 | 9065 | 205 | Inventive |
| 30 | 983 | 16 | 8341 | 229 | example |
| 31 | 974 | 16 | 4723 | 125 | Comp. ex |
| 32 | 814 | 24 | 6663 | 285 | Inv. ex |
| 33 | 849 | 20 | 7641 | 122 | Comparative |
| 34 | 832 | 22 | 5320 | 131 | example |
| 35 | 1106 | 13 | 12014 | 276 | Inv. ex. |
| 36 | 924 | 18 | 4823 | 296 | Comp. ex |
| 37 | 1092 | 12 | 9005 | 223 | Inv. ex |
| 38 | 885 | 19 | 7509 | 127 | Comp. ex. |
| 39 | 821 | 23 | 6516 | 190 | Inventive |
| 40 | 787 | 27 | 7079 | 236 | example |
| 41 | 866 | 16 | 5736 | 236 | Comp. ex |
| 42 | 917 | 17 | 7450 | 292 | Inventive |
| 43 | 893 | 20 | 8704 | 170 | example |
| 44 | 1022 | 16 | 8047 | 171 | |
| 45 | 837 | 25 | 9968 | 229 | |
| 46 | 924 | 12 | 4620 | 131 | Comp. ex |
| 47 | 917 | 19 | 8542 | 216 | Inventive |
| 48 | 919 | 18 | 7835 | 175 | example |
| 49 | 925 | 18 | 7794 | 187 | |
| 50 | 957 | 18 | 5315 | 138 | Comparative |
| 51 | 836 | 23 | 7294 | 135 | example |
| 52 | 1037 | 15 | 4982 | 279 | |
| 53 | 797 | 24 | 4532 | 138 | |

As is clear from Table 3, it is found that example embodiments of the present invention that satisfied all the requirements of the present invention have high strength and hole expandability as well as excellent toughness. In contrast to these example embodiments of the present invention, the results for the comparative examples showed that at least one of hole expandability and toughness deteriorated.

Specifically, in Test No. 5, the cooling stop temperature in the secondary cooling process was low and martensite was formed, and consequently the area fraction of ferrite and bainite was less than 90% and the toughness deteriorated.

In Test No. 16, because the end temperature in the rough rolling process was too low, Ti carbo-nitrides completely precipitated and could not be redissolved thereafter, and consequently variations in the grain size of the Ti carbo-nitrides increased, and in accompaniment therewith, variations in the grain size of ferrite and bainite also increased, and as a result the hole expandability and the toughness both deteriorated.

In Test No. 20, the heating temperature in the heating process after rough rolling was too high, and consequently ferrite and bainite coarsened and the toughness deteriorated.

In Test No. 21, the cooling rate in the secondary cooling process was too low, and consequently pearlite, cementite or the like was excessively formed and the hole expandability deteriorated.

In Test No. 22, the cooling time period was too long in the slow cooling process after primary cooling, and consequently the area fraction of ferrite was excessive, which resulted in the toughness deteriorating. In Test No. 23, the heating rate in the heating process after rough rolling was low, and consequently ferrite and bainite coarsened and the toughness deteriorated.

In Test No. 24, because the finishing temperature in the finish rolling was too high, differences in the timings of precipitation of Ti carbo-nitrides were large. Further, variations in the grain size of the Ti carbo-nitrides increased, and in accompaniment therewith, variations in the grain size of ferrite and bainite also became large, and consequently hole expandability and toughness both deteriorated.

In Test No. 27, the heating temperature in the heating process after rough rolling was low and redissolution of Ti carbo-nitrides was insufficient, and consequently variations in the grain size of the Ti carbo-nitrides increased, and in accompaniment therewith, variations in the grain size of ferrite and bainite also became large, and as a result the hole expandability and the toughness both deteriorated. In Test No. 28, the time period from the end of the sheet bar heating process to the start of the finish rolling process was more than 20 seconds, and consequently the micro-structure coarsened and variations in the diameter of the precipitates became large.

In Test No. 31, because the end temperature in the rough rolling process was too low, Ti carbo-nitrides completely precipitated and could not be redissolved thereafter, and consequently variations in the grain size of the Ti carbo-nitrides increased, and in accompaniment therewith, variations in the grain size of ferrite and bainite also increased, and as a result the hole expandability and the toughness both deteriorated.

In Test No. 33, the cooling stop temperature in the secondary cooling process was high, and consequently the area fraction of ferrite was excessive, which resulted in the toughness deteriorating. In Test No. 34, because a sheet bar heating process was not performed, redissolution of Ti carbo-nitrides was insufficient, and consequently variations in the grain size of the Ti carbo-nitrides increased, and in accompaniment therewith, variations in the grain size of ferrite and bainite also increased, and as a result the hole expandability and the toughness both deteriorated.

In Test No. 36, the cooling stop temperature in the primary cooling process was low and consequently pearlite was formed, and therefore the hole expandability deteriorated. In Test No. 38, because the cooling rate in the primary cooling process was low, variations in the grain size of ferrite and bainite were large, and therefore the toughness deteriorated. In Test No. 41, because the cooling stop temperature in the primary cooling process was high, ferrite was not sufficiently produced, and therefore the hole expandability deteriorated.

In Test No. 46, because the end temperature in the rough rolling process was too high, it was difficult for Ti carbo-nitrides to efficiently redissolve, and therefore variations in the grain size of Ti carbo-nitrides became large. Further, in accompaniment therewith, variations in the grain size of ferrite and bainite also became large, and as a result the hole expandability and the toughness both deteriorated.

In Test No. 50, the total rolling reduction in the rough rolling process was low, while in Test No. 51 the heating time period in the sheet bar heating process was insufficient. Therefore, in both of these cases, variations in the grain size of Ti carbo-nitrides became large, and in accompaniment therewith, variations in the grain size of ferrite and bainite also became large, and as a result the hole expandability and the toughness both deteriorated.

In Test No. 52, the content of C was excessive, while in Test No. 53 the content of Mn was excessive, and therefore the hole expandability decreased.

Example 2

Next, solid wires having the chemical compositions shown in Table 4 were prepared, and were adopted as welding material. The welding materials shown in Table 5 were then used to perform bead-on-plate welding with respect to the surface of the test materials described above. That is, in the present example, the first base metal portion and the second base metal portion were made of the same steel material. Welding was performed by gas-shielded arc welding, and the welding conditions were as follows: current value: 190 A, voltage: 23 V, welding speed: 100 cm/min, shielding gas: Ar+20% $CO_2$.

TABLE 4

| Welding material | Chemical composition (in mass %, balance: Fe and impurities) | | | | | | | | | | | | | |
|---|---|---|---|---|---|---|---|---|---|---|---|---|---|---|
| | C | Si | Mn | P | S | Al | Ti | N | Cr | Nb | V | B | Ca | O |
| W | 0.06 | 0.1 | 0.6 | 0.010 | 0.003 | 0.03 | 0.04 | 0.003 | — | — | — | — | — | 0.004 |
| X | 0.04 | 0.8 | 1.2 | 0.010 | 0.003 | 0.04 | 0.12 | 0.003 | — | 0.020 | — | — | — | 0.004 |
| Y | 0.16 | 0.4 | 1.0 | 0.010 | 0.002 | 0.03 | 0.06 | 0.004 | — | — | 0.30 | — | 0.003 | 0.004 |
| Z | 0.10 | 0.8 | 2.5 | 0.010 | 0.001 | 0.02 | 0.11 | 0.005 | — | — | — | 0.002 | — | 0.004 |

The chemical composition of the weld metal portion of each obtained weld joint was measured. Specifically, machined chips were collected from the weld metal portion in a manner so that the base metal portion did not get mixed therein. Analysis was then performed by inductively coupled plasma optical emission spectrometry and a high frequency combustion using the collected machined chips. The results of measuring the chemical composition of the respective weld metal portions are shown in Table 5.

TABLE 5

| Test No. | Steel sheet | Steel | Welding material | Chemical composition of weld metal portion (in mass %, balance: Fe and impurities) | | | | | | | | | |
|---|---|---|---|---|---|---|---|---|---|---|---|---|---|
| | | | | C | Si | Mn | P | S | Al | Ti | N | Cu | Ni |
| 1 | A1 | A | W | 0.08 | 0.5 | 0.2 | 0.01 | 0.003 | 0.02 | 0.08 | 0.004 | — | — |
| 2 | A2 | | X | 0.06 | 1.1 | 0.9 | 0.01 | 0.003 | 0.03 | 0.12 | 0.004 | — | — |
| 3 | A3 | | Y | 0.16 | 0.9 | 0.7 | 0.01 | 0.003 | 0.02 | 0.11 | 0.004 | — | — |
| 4 | A4 | | Z | 0.10 | 1.0 | 1.8 | 0.01 | 0.002 | 0.02 | 0.15 | 0.005 | — | — |
| 5 | B1 | B | W | 0.08 | 0.3 | 0.9 | 0.01 | 0.003 | 0.03 | 0.06 | 0.004 | — | — |
| 6 | B2 | | W | 0.08 | 0.3 | 0.9 | 0.01 | 0.003 | 0.03 | 0.06 | 0.003 | — | — |
| 7 | B3 | | X | 0.07 | 0.6 | 1.5 | 0.01 | 0.003 | 0.04 | 0.10 | 0.003 | — | — |
| 8 | C1 | C | W | 0.06 | 0.3 | 0.8 | 0.01 | 0.003 | 0.04 | 0.09 | 0.004 | — | — |
| 9 | C2 | | X | 0.06 | 0.6 | 1.2 | 0.01 | 0.003 | 0.05 | 0.12 | 0.004 | — | — |
| 10 | C3 | | X | 0.06 | 0.7 | 1.3 | 0.01 | 0.003 | 0.04 | 0.11 | 0 003 | — | — |
| 11 | D1 | D | W | 0.05 | 0.5 | 0.8 | 0.01 | 0.002 | 0.03 | 0.10 | 0 003 | — | — |
| 12 | D2 | | W | 0.05 | 0.4 | 0.7 | 0.01 | 0.002 | 0.04 | 0.10 | 0.003 | — | — |
| 13 | D3 | | X | 0.04 | 0.8 | 1.0 | 0.01 | 0.002 | 0.05 | 0.13 | 0.003 | — | — |
| 14 | E1 | E | X | 0.11 | 0.6 | 1.4 | 0.01 | 0.005 | 0.03 | 0.12 | 0.003 | — | — |
| 15 | E2 | | X | 0.08 | 0.6 | 1.2 | 0.01 | 0.004 | 0.04 | 0.12 | 0.003 | — | — |
| 16 | E3 | | W | 0.11 | 0.3 | 0.9 | 0.01 | 0.004 | 0.03 | 0.06 | 0.003 | — | — |
| 17 | F1 | F | W | 0.07 | 0.6 | 1.0 | 0.01 | 0.004 | 0.04 | 0.06 | 0.004 | — | — |
| 18 | F2 | | W | 0.06 | 0.7 | 0.9 | 0.01 | 0.004 | 0.04 | 0.05 | 0.004 | — | — |
| 19 | F3 | | X | 0.05 | 0.8 | 1.1 | 0.01 | 0.004 | 0.04 | 0.10 | 0.004 | — | — |
| 20 | G1 | G | X | 0.04 | 0.5 | 1.2 | 0.01 | 0.004 | 0.03 | 0.12 | 0.004 | — | — |
| 21 | G2 | | W | 0.06 | 0.2 | 0.7 | 0.01 | 0.003 | 0.02 | 0.08 | 0.004 | — | — |
| 22 | G3 | | X | 0.04 | 0.6 | 1.3 | 0.01 | 0.003 | 0.03 | 0.12 | 0.003 | — | — |
| 23 | H1 | H | X | 0.05 | 0.6 | 0.7 | 0.01 | 0.004 | 0.03 | 0.09 | 0.003 | — | — |
| 24 | H2 | | X | 0.05 | 0.7 | 0.7 | 0.01 | 0.004 | 0.03 | 0.09 | 0.003 | — | — |
| 25 | H3 | | W | 0.06 | 0.3 | 0.8 | 0.01 | 0.003 | 0.02 | 0.06 | 0.003 | — | — |
| 26 | I1 | I | W | 0.06 | 0.4 | 0.9 | 0.01 | 0.003 | 0.03 | 0.05 | 0.005 | — | — |
| 27 | I2 | | W | 0.05 | 0.3 | 0.9 | 0.01 | 0.004 | 0.03 | 0.06 | 0.004 | — | — |
| 28 | I3 | | W | 0.05 | 0.3 | 0.9 | 0.01 | 0 004 | 0.03 | 0.05 | 0.004 | — | — |
| 29 | J1 | J | X | 0.08 | 0.6 | 1.2 | 0.01 | 0.005 | 0.04 | 0.11 | 0.003 | — | — |
| 30 | J2 | | X | 0.08 | 0.6 | 1.2 | 0.01 | 0.004 | 0.04 | 0.10 | 0.003 | — | — |
| 31 | J3 | | X | 0.08 | 0.6 | 1.2 | 0.01 | 0.004 | 0.04 | 0.10 | 0.003 | — | — |
| 32 | K1 | K | W | 0.08 | 0.2 | 0.9 | 0.01 | 0.002 | 0.04 | 0.06 | 0.003 | — | — |
| 33 | K2 | | X | 0.09 | 0.6 | 1.2 | 0.01 | 0.003 | 0.04 | 0.13 | 0.003 | — | — |
| 34 | K3 | | X | 0.09 | 0.6 | 1.2 | 0.01 | 0.003 | 0.04 | 0.13 | 0.003 | — | — |
| 35 | L1 | L | W | 0.05 | 0.4 | 0.9 | 0.01 | 0.004 | 0.03 | 0.10 | 0.003 | — | — |
| 36 | L2 | | X | 0.04 | 0.9 | 1.3 | 0.01 | 0.003 | 0.03 | 0.13 | 0.003 | — | — |
| 37 | M1 | M | W | 0.05 | 0.7 | 0.9 | 0.01 | 0.003 | 0.03 | 0.10 | 0.003 | — | — |
| 38 | M2 | | X | 0.04 | 1.0 | 1.3 | 0.01 | 0.003 | 0.03 | 0.11 | 0.003 | — | — |
| 39 | N1 | N | W | 0.07 | 0.1 | 0.9 | 0.01 | 0.004 | 0.03 | 0.07 | 0.003 | — | — |
| 40 | N2 | | X | 0.06 | 0.4 | 1.2 | 0.01 | 0.004 | 0.03 | 0.11 | 0.003 | — | — |
| 41 | O1 | O | W | 0.07 | 0.6 | 1.0 | 0.01 | 0.003 | 0.03 | 0.06 | 0.004 | — | — |
| 42 | O2 | | X | 0.06 | 0.8 | 1.1 | 0.01 | 0.003 | 0.04 | 0.10 | 0.004 | — | — |
| 43 | P1 | P | X | 0.09 | 0.8 | 1.2 | 0.01 | 0.004 | 0.05 | 0.13 | 0.005 | — | — |
| 44 | P2 | | Y | 0.15 | 0.6 | 0.8 | 0.01 | 0.002 | 0.03 | 0.11 | 0.005 | — | — |
| 45 | P3 | | Z | 0.12 | 0.7 | 1.7 | 0.01 | 0.002 | 0.03 | 0.11 | 0.006 | — | — |
| 46 | P4 | | X | 0.07 | 0.8 | 0.9 | 0.01 | 0.003 | 0.04 | 0.14 | 0.005 | — | — |
| 47 | Q1 | Q | W | 0.10 | 0.2 | 1.1 | 0.01 | 0.003 | 0.03 | 0.08 | 0.004 | 0.10 | — |
| 48 | R1 | R | W | 0.07 | 0.5 | 1.2 | 0.01 | 0.003 | 0.03 | 0.10 | 0.004 | — | 0.21 |
| 49 | S1 | S | W | 0.09 | 0.4 | 0.8 | 0.01 | 0.003 | 0.03 | 0.05 | 0.003 | — | — |
| 50 | S2 | | W | 0.08 | 0.4 | 0.7 | 0.01 | 0.002 | 0.03 | 0.05 | 0.003 | — | — |
| 51 | S3 | | W | 0.09 | 0 4 | 0.7 | 0.01 | 0.002 | 0.03 | 0.05 | 0.003 | — | — |
| 52 | T1 | T | X | 0.11 | 0.6 | 1.3 | 0.01 | 0.002 | 0.04 | 0.11 | 0.005 | — | — |
| 53 | U1 | U | X | 0.07 | 0.5 | 2.4 | 0.01 | 0.005 | 0.04 | 0.11 | 0.003 | — | — |

| Test No. | Chemical composition of weld metal portion (in mass %, balance: Fe and impurities) | | | | | | |
|---|---|---|---|---|---|---|---|
| | Cr | Mo | Nb | V | B | Ca | O |
| 1 | — | — | — | — | — | — | 0.004 |
| 2 | — | — | 0.005 | — | — | — | 0.004 |
| 3 | — | — | — | 0.21 | — | 0.0013 | 0.004 |
| 4 | — | — | — | — | 0.0009 | — | 0.004 |
| 5 | — | — | 0.009 | — | — | — | 0.004 |
| 6 | — | — | 0.012 | — | — | — | 0.004 |

TABLE 5-continued

| | | | | | | | |
|---|---|---|---|---|---|---|---|
| 7 | — | — | 0.022 | — | — | — | 0.004 |
| 8 | 0.22 | — | — | — | — | — | 0.007 |
| 9 | 0.33 | — | 0.002 | — | — | — | 0.007 |
| 10 | 0.22 | — | 0.007 | — | — | — | 0.007 |
| 11 | — | — | — | 0.12 | — | — | 0.004 |
| 12 | — | — | — | 0.12 | — | — | 0.004 |
| 13 | — | — | 0.019 | 0.12 | — | — | 0.004 |
| 14 | — | — | 0.007 | — | 0.0008 | — | 0.007 |
| 15 | — | — | 0.005 | — | 0.0010 | — | 0.007 |
| 16 | — | — | — | — | 0.0010 | — | 0.007 |
| 17 | — | — | — | — | — | 0.0012 | 0.004 |
| 18 | — | — | — | — | — | 0.0012 | 0.004 |
| 19 | — | — | 0.013 | — | — | 0.0012 | 0.004 |
| 20 | — | — | 0.018 | — | 0.0008 | — | 0.004 |
| 21 | — | — | 0.009 | — | 0.0007 | — | 0.004 |
| 22 | — | — | 0.019 | — | 0.0008 | — | 0.004 |
| 23 | 0.14 | — | 0.001 | 0.12 | — | — | 0.004 |
| 24 | 0.14 | — | 0.013 | 0.12 | — | — | 0.004 |
| 25 | 0.18 | — | — | 0.10 | — | — | 0.004 |
| 26 | — | — | 0.012 | — | 0.0005 | — | 0.005 |
| 27 | — | — | 0.012 | — | 0.0006 | — | 0.005 |
| 28 | — | — | 0.012 | — | 0.0006 | — | 0.005 |
| 29 | — | — | 0.019 | — | — | 0.0013 | 0.006 |
| 30 | — | — | 0.021 | — | — | 0.0013 | 0.006 |
| 31 | — | — | 0.021 | — | — | 0.0013 | 0.006 |
| 32 | — | — | 0.093 | — | — | 0.0011 | 0.004 |
| 33 | — | — | 0.015 | — | — | 0.0014 | 0.004 |
| 34 | — | — | 0.015 | — | — | 0.0014 | 0.004 |
| 35 | 0.26 | — | — | — | 0.0011 | — | 0.006 |
| 36 | 0.26 | — | 0.001 | — | 0.0009 | — | 0.006 |
| 37 | — | — | — | 0.13 | 0.0013 | — | 0.006 |
| 38 | — | — | 0.002 | 0.15 | 0.0008 | — | 0.006 |
| 39 | 0.24 | — | — | — | — | 0.0009 | 0.004 |
| 40 | 0.30 | — | 0.005 | — | — | 0.0013 | 0.004 |
| 41 | — | — | — | 0.17 | — | 0.0012 | 0.004 |
| 42 | — | — | 0.009 | 0.17 | — | 0.0018 | 0.004 |
| 43 | 0.35 | — | 0.023 | — | — | — | 0.004 |
| 44 | 0.35 | — | 0.013 | 0.13 | — | 0.0021 | 0.004 |
| 45 | 0.35 | — | 0.011 | — | 0.0012 | — | 0.004 |
| 46 | 0.35 | — | 0.019 | — | — | — | 0.004 |
| 47 | — | — | — | — | — | — | 0.007 |
| 48 | — | — | — | — | — | — | 0.005 |
| 49 | — | 0.12 | — | — | — | — | 0.005 |
| 50 | — | 0.15 | — | — | — | — | 0.004 |
| 51 | — | 0.15 | — | — | — | — | 0.004 |
| 52 | — | — | 0.020 | — | — | — | 0.005 |
| 53 | — | — | 0.005 | — | — | — | 0.005 |

Thereafter, each obtained weld joint was cut out so that a cross-section which was parallel to the surface of the test material on which the welding was performed and which was at a position that was at a distance equivalent to ⅛ t in the thickness direction from the surface of the test material became the observation surface. Then, as described above, regions of 50 μm in the Y-direction and 500 μm in the X-direction were selected at a pitch of 50 μm from one of the boundaries between the steel material and the weld metal portion toward the steel material side in the Y-direction. The area fractions ($m_0$ to $m_5$: %) of bainite in the respective regions were measured.

Figure 6:
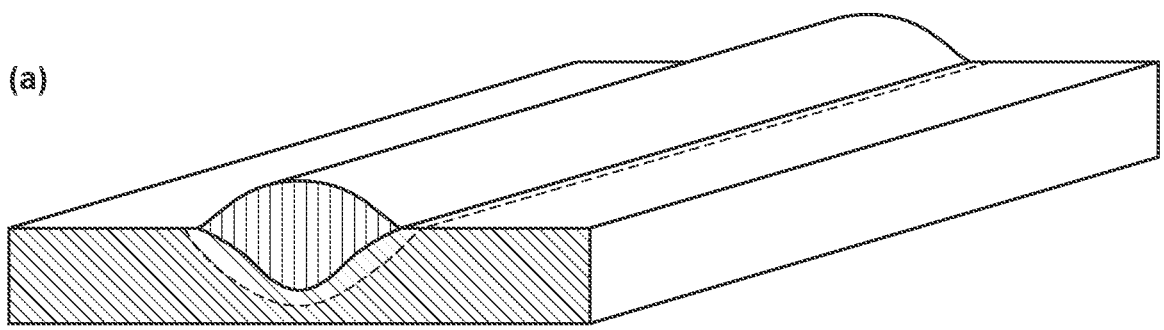
FIG. 6 shows views for describing a method for collecting a V-notch Charpy impact test specimen.
Figure 6:
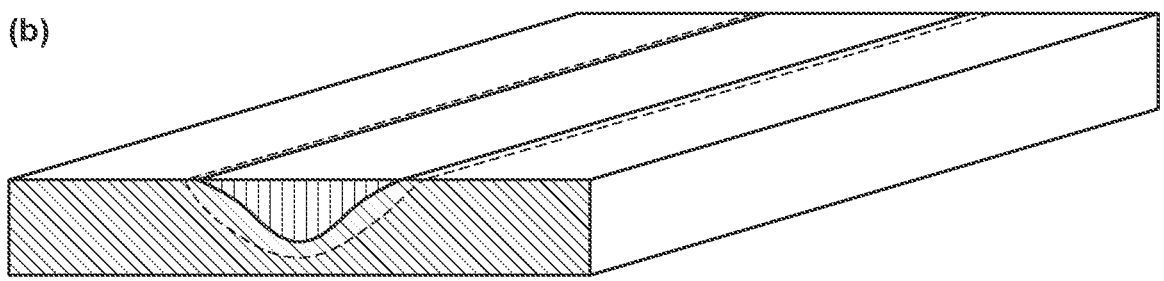
Figure 6:
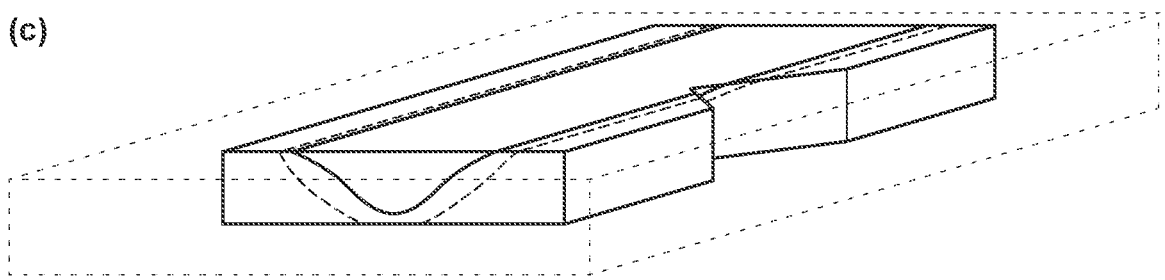

In addition, a V-notch Charpy impact test specimen was prepared in the manner illustrated in FIG. 6 from each of the weld joints. With regard to the weld joint made by bead-on-plate welding having the shape illustrated in FIG. 6(a), first, as illustrated in FIG. 6(b), a portion of the weld metal portion protruding from the surface of the test material was ground to flatten the surface.

Next, as illustrated in FIG. 6(c), a V-notch test specimen having a length of 55 mm, a width of 10 mm, and a thickness of 2.5 mm defined in JIS Z 2242 (2018) was cut out so that the extending direction of the weld metal portion became the longitudinal direction. At such time, the surface of the steel material on which the welding was performed is made to be the surface of the V-notch test specimen. Further, in a case where the thickness of the steel material is 2.5 mm or less, the thickness of the steel material is taken as being the thickness of the V-notch test specimen.

Figure 7:
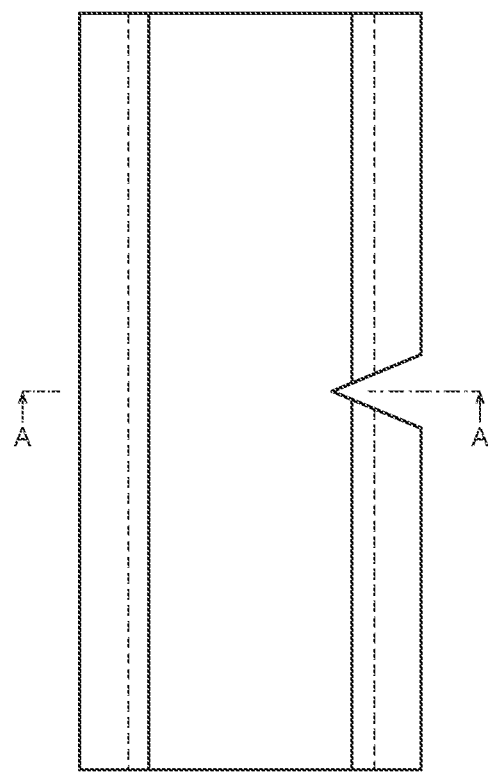
FIG. 7 shows views for describing a position for cutting a V-notch.
Figure 7:

FIGS. 7(a) and 7(b) are views for describing the position for cutting out the V-notch. FIG. 7(a) is a view of the V-notch test specimen from the thickness direction, and FIG. 7(b) is a cross-sectional view illustrating an AA portion in FIG. 7(a). As illustrated in FIGS. 7(a) and 7(b), the tip of the V-notch is cut out so as to pass through the boundary between the weld metal portion and the HAZ. Subsequently, a Charpy test was performed at −40° C. using the obtained V-notch test specimen, and the value of the absorbed energy was evaluated. In the present example, a value of absorbed energy of 50 J/cm$^2$ or more was regarded as acceptable.

A summary of the results is shown in Table 6.

TABLE 6

| Test No. | Steel sheet | Steel | Welding material | Bainite area fraction in HAZ (area %) $m_0$ | $m_1$ | $m_2$ | $m_3$ | $m_4$ | $m_5$ | Changes in micro-structure | Impact absorbed energy at −40° C. (J/cm²) | |
|---|---|---|---|---|---|---|---|---|---|---|---|---|
| 1  | A1 | A | W | 62 | 57 | 46 | 27 | 17 | 13 | ○ | 163 | Inventive |
| 2  | A2 |   | X | 91 | 82 | 67 | 49 | 34 | 31 | ○ | 151 | example |
| 3  | A3 |   | Y | 86 | 76 | 60 | 39 | 24 | 20 | x | 42  | Comparative |
| 4  | A4 |   | Z | 64 | 62 | 53 | 31 | 24 | 21 | x | 24  | example |
| 5  | B1 | B | W | 74 | 49 | 28 | 25 | 25 | 25 | x | 31  |  |
| 6  | B2 |   | W | 63 | 58 | 48 | 35 | 22 | 19 | ○ | 83  | Inventive |
| 7  | B3 |   | X | 67 | 62 | 51 | 36 | 22 | 19 | ○ | 163 | example |
| 8  | C1 | C | W | 67 | 64 | 50 | 36 | 26 | 23 | ○ | 168 |  |
| 9  | C2 |   | X | 69 | 65 | 49 | 36 | 21 | 17 | ○ | 73  |  |
| 10 | C3 |   | X | 80 | 73 | 60 | 46 | 32 | 29 | ○ | 180 |  |
| 11 | D1 | D | W | 81 | 71 | 55 | 36 | 18 | 14 | ○ | 111 |  |
| 12 | D2 |   | W | 68 | 61 | 51 | 34 | 21 | 18 | ○ | 121 |  |
| 13 | D3 |   | X | 72 | 65 | 55 | 38 | 25 | 22 | ○ | 78  |  |
| 14 | E1 | E | X | 70 | 66 | 50 | 36 | 23 | 20 | ○ | 168 |  |
| 15 | E2 |   | X | 79 | 75 | 61 | 45 | 28 | 24 | ○ | 133 |  |
| 16 | E3 |   | W | 77 | 77 | 63 | 28 | 25 | 25 | x | 45  | Comp. ex. |
| 17 | F1 | F | W | 73 | 67 | 57 | 38 | 21 | 18 | ○ | 150 | Inventive |
| 18 | F2 |   | W | 63 | 57 | 47 | 34 | 25 | 22 | ○ | 157 | example |
| 19 | F3 |   | X | 72 | 66 | 52 | 33 | 16 | 11 | ○ | 156 |  |
| 20 | G1 | G | X | 74 | 74 | 58 | 16 | 13 | 13 | x | 24  | Comparative |
| 21 | G2 |   | W | 89 | 89 | 70 | 22 | 19 | 19 | x | 29  | example |
| 22 | G3 |   | X | 61 | 61 | 46 | 8  | 5  | 5  | x | 42  |  |
| 23 | H1 | H | X | 71 | 71 | 57 | 23 | 20 | 20 | x | 37  |  |
| 24 | H2 |   | X | 81 | 81 | 66 | 27 | 24 | 24 | x | 31  |  |
| 25 | H3 |   | W | 93 | 81 | 65 | 49 | 32 | 24 | ○ | 124 | Inventive |
| 26 | I1 | I | W | 77 | 68 | 51 | 34 | 21 | 16 | ○ | 141 | example |
| 27 | I2 |   | W | 65 | 65 | 51 | 17 | 14 | 14 | x | 27  | Comparative |
| 28 | I3 |   | W | 81 | 79 | 72 | 45 | 28 | 23 | x | 56  | example |
| 29 | J1 | J | X | 93 | 81 | 62 | 43 | 27 | 20 | ○ | 168 | Inventive |
| 30 | J2 |   | X | 85 | 76 | 62 | 48 | 30 | 27 | ○ | 115 | example |
| 31 | J3 |   | X | 79 | 78 | 75 | 57 | 21 | 14 | x | 43  | Comp. ex. |
| 32 | K1 | K | W | 67 | 61 | 53 | 40 | 28 | 25 | ○ | 107 | Inv. ex. |
| 33 | K2 |   | X | 67 | 67 | 49 | 3  | 0  | 0  | x | 44  | Comparative |
| 34 | K3 |   | X | 71 | 70 | 65 | 32 | 21 | 19 | x | 43  | example |
| 35 | L1 | L | W | 62 | 59 | 50 | 31 | 22 | 19 | ○ | 96  | Inv. ex. |
| 36 | L2 |   | X | 68 | 68 | 56 | 25 | 23 | 23 | x | 42  | Comp. ex. |
| 37 | M1 | M | W | 81 | 71 | 55 | 36 | 19 | 12 | ○ | 82  | Inv. ex. |
| 38 | M2 |   | X | 72 | 72 | 60 | 29 | 27 | 27 | x | 34  | Comp. ex. |
| 39 | N1 | N | W | 71 | 64 | 51 | 35 | 17 | 11 | ○ | 167 | Inventive |
| 40 | N2 |   | X | 73 | 65 | 52 | 35 | 21 | 17 | ○ | 138 | example |
| 41 | O1 | O | W | 95 | 95 | 82 | 47 | 45 | 45 | x | 30  | Comp. ex. |
| 42 | O2 |   | X | 72 | 68 | 53 | 41 | 26 | 23 | ○ | 140 | Inventive |
| 43 | P1 | P | X | 94 | 87 | 72 | 53 | 33 | 29 | ○ | 140 | example |
| 44 | P2 |   | Y | 72 | 72 | 60 | 29 | 27 | 27 | x | 47  | Comparative |
| 45 | P3 |   | Z | 92 | 92 | 74 | 27 | 24 | 24 | x | 40  | example |
| 46 | P4 |   | X | 67 | 62 | 35 | 23 | 20 | 17 | x | 45  |  |
| 47 | Q1 | Q | W | 72 | 65 | 52 | 36 | 28 | 26 | ○ | 138 | Inventive |
| 48 | R1 | R | W | 68 | 66 | 55 | 42 | 32 | 28 | ○ | 125 | example |
| 49 | S1 | S | W | 65 | 62 | 42 | 28 | 20 | 15 | ○ | 143 |  |
| 50 | S2 |   | W | 81 | 78 | 72 | 45 | 15 | 11 | x | 41  | Comparative |
| 51 | S3 |   | W | 79 | 77 | 43 | 31 | 26 | 24 | x | 43  | example |
| 52 | T1 | T | X | 92 | 92 | 76 | 34 | 31 | 31 | x | 45  |  |
| 53 | U1 | U | X | 91 | 91 | 71 | 22 | 18 | 18 | x | 32  |  |

As is also clear from Table 6, it is found that example embodiments of the present invention that satisfy all the requirements of the present invention have excellent low-temperature toughness. In contrast to these example embodiments of the present invention, for the comparative examples, the results showed that because changes in the micro-structure in a HAZ were abrupt, the low-temperature toughness was poor.

INDUSTRIAL APPLICABILITY

According to the present invention, it is possible to obtain a hot-rolled steel sheet having excellent toughness in addition to high strength and hole expandability. Further, a weld joint made using the hot-rolled steel sheet has excellent low-temperature toughness in a weld zone.

REFERENCE SIGNS LIST

1. Weld Joint

10. First Base Metal Portion

10a. End Portion

10b. Surface

20. Second Base Metal Portion

30. Weld Metal Portion

100, 200. HAZ

The invention claimed is:
1. A hot-rolled steel sheet having a chemical composition comprising, in mass %:
C: 0.02 to 0.20%,
Si: 0.01 to 1.50%,
Mn: 0.10 to 3.00%,
P: 0.10% or less,
S: 0.010% or less,
Al: 0.005 to 0.100%,
Ti: 0.02 to 0.20%,
N: 0.001 to 0.010%,
Cu: 0 to 0.50%,
Ni: 0 to 0.50%,
Cr: 0 to 1.00%,
Mo: 0 to 0.40%,
Nb: 0 to 0.060%,
V: 0 to 1.00%,
B: 0 to 0.0100%,
Ca: 0 to 0.0050%,
O: 0.0100% or less, and
the balance: Fe and impurities,
wherein:
a steel micro-structure includes, in area %:
ferrite: 60 to 80%, and
a total of ferrite and bainite: 90% or more;
an average of a crystal grain size of ferrite and bainite is 7.0 μm or less, and a standard deviation of the crystal grain size is 2.0 μm or less;
a standard deviation of a diameter of Ti carbo-nitrides is 10 nm or less,
a tensile strength is 780 MPa or more;
a relation $TS \times \lambda^{0.5}$ between the tensile strength TS in MPa and a hole expansion ratio $\lambda$ in % is 6000 MPa·%$^{0.5}$ or more; and
a Charpy impact absorbed energy at $-40°$ C. is 150 kJ/cm$^2$ or more.
2. The hot-rolled steel sheet according to claim 1, wherein:
the chemical composition contains at least one of, in mass %:
Cu: 0.01 to 0.50%,
Ni: 0.01 to 0.50%,
Cr: 0.01 to 1.00%,
Mo: 0.005 to 0.40%,
Nb: 0.001 to 0.060%,
V: 0.01 to 1.00%,
B: 0.0005 to 0.0100%, and
Ca: 0.0005 to 0.0050%.
3. A method for producing a hot-rolled steel sheet according to claim 1, that comprises performing, in order:
(a) a process of casting a slab having the chemical composition according to claim 1;
(b) a slabbing process of, after casting, without a temperature of the slab decreasing to less than 800° C., performing a rough rolling process described hereunder, or inserting the slab into a slab heating furnace and heating the slab to within a range of 1100 to 1250° C.;
(c) a rough rolling process of performing hot rolling of the slab in which a start temperature is within a range of 950 to 1200° C., an end temperature is within a range of 800 to 1050° C., and a total rolling reduction is 20% or more, to form a sheet bar;
(d) a sheet bar heating process of heating the sheet bar for 60 seconds or more to a temperature range of 1100 to 1250° C. at an average heating rate of 100° C./min or more;
(e) a finish rolling process of, within 20 seconds after the sheet bar heating process ends, subjecting the sheet bar to hot rolling with a start temperature within a range of 900 to 1250° C. and an end temperature within a range of an Ar$_3$ point or more to less than 950° C., and with a total rolling reduction of 50% or more, to form a steel sheet;
(f) a cooling process of subjecting the steel sheet to primary cooling to a temperature range of 600 to 750° C. at an average cooling rate of 60° C./s or more, and thereafter conducting slow cooling at an average cooling rate of 0 to 10° C./s for a period of 0 to 10 seconds, and additionally thereafter conducting secondary cooling at an average cooling rate of 60° C./s or more to a temperature which is equal to or less than a temperature 15° C. or more lower than an end temperature of the slow cooling and which is within a temperature range of 350 to 700° C.; and
(g) a coiling process of coiling the steel sheet.
4. A weld joint, comprising a first base metal portion, a second base metal portion and a weld metal portion, wherein:
the weld metal portion is formed so as to extend at least in a first direction along an end portion of the first base metal portion;
the first base metal portion is the hot-rolled steel sheet according to claim 1;
a chemical composition of the weld metal portion comprises, in mass %:
C: 0.02 to 0.15%,
Si: 0.01 to 1.50%,
Mn: 0.10 to 1.50%,
P: 0.10% or less,
S: 0.010% or less,
Al: 0.005 to 0.300%,
Ti: 0.02 to 0.20%,
N: 0.010% or less,
Cu: 0 to 0.50%,
Ni: 0 to 0.50%,
Cr: 0 to 1.00%,
Mo: 0 to 0.60%,
Nb: 0 to 0.060%,
V: 0 to 1.00%,
B: 0 to 0.0100%,
Ca: 0 to 0.0050%,
O: 0.0010 to 0.0500%, and
the balance: Fe and impurities;
and when a direction perpendicular to the first direction as viewed from a thickness direction of the first base metal portion is taken as a second direction, and
a thickness of the first base metal portion is represented by "t",
at a cross-section which is parallel to a surface on one side in the thickness direction of the first base metal portion and which is at a position at a distance equivalent to ⅛ t in the thickness direction from the surface,
$m_0$, $m_1$, $m_2$, $m_3$, $m_4$, and $m_5$ that are area fractions (%) of bainite measured in order at a pitch of 50 μm from a boundary between the first base metal portion and the weld metal portion toward the first base metal portion side in the second direction satisfy formula (i) below:

$$0 < m_{n-1} - m_n \leq 20 \qquad (i)$$

where, n in the formula is a natural number from 1 to 5.
5. The weld joint according to claim 4, wherein:
the thickness of the first base metal portion is within a range of 0.8 to 6.0 mm.

6. The weld joint according to claim 4, wherein:
the second base metal portion is a hot-rolled steel sheet having a chemical composition comprising, in mass %:
C: 0.02 to 20%,
Si: 0.01 to 1.50%,
Mn: 0.10 to 3.00%,
P: 0.10% or less,
S: 0.010% or less,
Al: 0.005 to 0,100%,
Ti: 0.02 to 0.20%,
N: 0.001 to 0.010%,
Cu: 0 to 0.50%,
Ni: 0 to 0.50%,
Cr: 0 to 1.00%,
Mo: 0 to 0.40%,
Nb: 0 to 0.060%,
V: 0 to 1.00%,
B: 0 to 0.0100%,
Ca: 0 to 0.0050%,
O: 0.0100% or less, and
the balance: Fe and impurities,
wherein:
a steel micro-structure includes, in area %:
ferrite: 60 to 80%, and
a total of ferrite and bainite: 90% or more;
an average of a crystal grain size of ferrite and bainite is 7.0 mm or less, and a standard deviation of the crystal grain size is 2.0 mm or less; and
a standard deviation of a diameter of Ti carbo-nitrides is 10 nm or less.

7. W The weld joint according to claim 4, wherein:
a thickness of the second base metal portion is within a range of 0.8 to 6.0 mm.

8. The weld joint according to claim 4, wherein:
the weld joint is a butt joint groove-welded in a state in which the first base metal portion and the second base metal portion are butted together.

9. The weld joint according to claim 4, wherein:
the weld joint is a lap joint that is fillet-welded in a state in which the first base metal portion is superimposed on the one side in a thickness direction of the second base metal portion.

10. A method for producing the weld joint according to claim 4, comprising:
performing gas-shielded arc welding using a solid wire or a flux cored wire with respect to the first base metal portion or the second base metal portion.

* * * * *

UNITED STATES PATENT AND TRADEMARK OFFICE
CERTIFICATE OF CORRECTION

| | |
|---|---|
| PATENT NO. | : 12,195,817 B2 |
| APPLICATION NO. | : 17/420024 |
| DATED | : January 14, 2025 |
| INVENTOR(S) | : Takeshi Toyoda et al. |

It is certified that error appears in the above-identified patent and that said Letters Patent is hereby corrected as shown below:

In the Claims

<u>Column 37; Line 5; Claim 6:</u>
Change:
"C: 0.02 to 20%,"
To:
--C: 0.02 to 0.20%,--

<u>Column 38; Line 7; Claim 7:</u>
Change:
"7. W The weld joint according to claim 4, wherein:"
To:
--7. The weld joint according to claim 4, wherein:--

Signed and Sealed this
Fifteenth Day of April, 2025

Coke Morgan Stewart
*Acting Director of the United States Patent and Trademark Office*